United States Patent [19]

Koike

[11] Patent Number: 5,763,514

[45] Date of Patent: Jun. 9, 1998

[54] PROCESS FOR PRODUCTING OPTICAL RESIN MATERIALS WITH DISTRIBUTED REFRACTIVE INDEX

[76] Inventor: Yasuhiro Koike, 534-23, Ichigao-cho, Midori-ku, Yokohama-shi, Kanagawa, 225, Japan

[21] Appl. No.: 475,101

[22] Filed: Jun. 7, 1995

Related U.S. Application Data

[62] Division of Ser. No. 78,179, Jun. 17, 1993, Pat. No. 5,541,247.

[30] Foreign Application Priority Data

Oct. 22, 1991 [JP] Japan ................................ 3-274354

[51] Int. Cl.$^6$ .................................................. C08F 263/00
[52] U.S. Cl. ........................ 525/265; 525/277; 525/306; 525/932
[58] Field of Search .................. 525/265, 277, 525/306, 932; 264/1.1, 1.4, 1.7, 1.5, 2.1

[56] References Cited

U.S. PATENT DOCUMENTS

| | | |
|---|---|---|
| 3,718,383 | 2/1973 | Moore . |
| 3,816,160 | 6/1974 | Moore ........................ 427/164 |
| 3,955,015 | 5/1976 | Ohtsuka et al. ................ 525/265 |
| 4,521,351 | 6/1985 | Ohtsuka et al. ................ 264/1.1 |

FOREIGN PATENT DOCUMENTS

| | | |
|---|---|---|
| 0 472 384 | 2/1992 | European Pat. Off. . |
| 472334 | 2/1992 | European Pat. Off. . |
| 55-18882 | 5/1980 | Japan . |
| 62-113109 | 5/1987 | Japan . |
| 4-97303 | 3/1992 | Japan . |

*Primary Examiner*—Jeffrey T. Smith
*Attorney, Agent, or Firm*—Staas & Halsey

[57] ABSTRACT

An optical resin, of which the refractive index continuously changes in a specific direction, is produced by filling a polymerization container with a mixed solution containing at least one type of polymerizable monomer or polymerizable monomer sol and at least one type of substance whose solubility parameter differs by 7 $(cal/cm^3)^{1/2}$ or less and refractive index by 0.001 or more from those of a polymer produced by polymerization of the monomer, and by subjecting the mixture to polymerization reaction by applying heat or energy rays to the container from outside so that the polymerization reaction starts and progresses preferentially from a particular region of the mixture, thus forming a concentration gradient of the substance having different refractive index.

The polymerization container may be made of a polymer which swells and dissolves into the mixed solution from an inner wall thereof.

After completing the polymerization reaction, the optical resin is subjected to hot drawing to obtain an optical conductor. Further, post-treatment based on crosslinking reaction is applied to improve heat resistance.

8 Claims, 19 Drawing Sheets

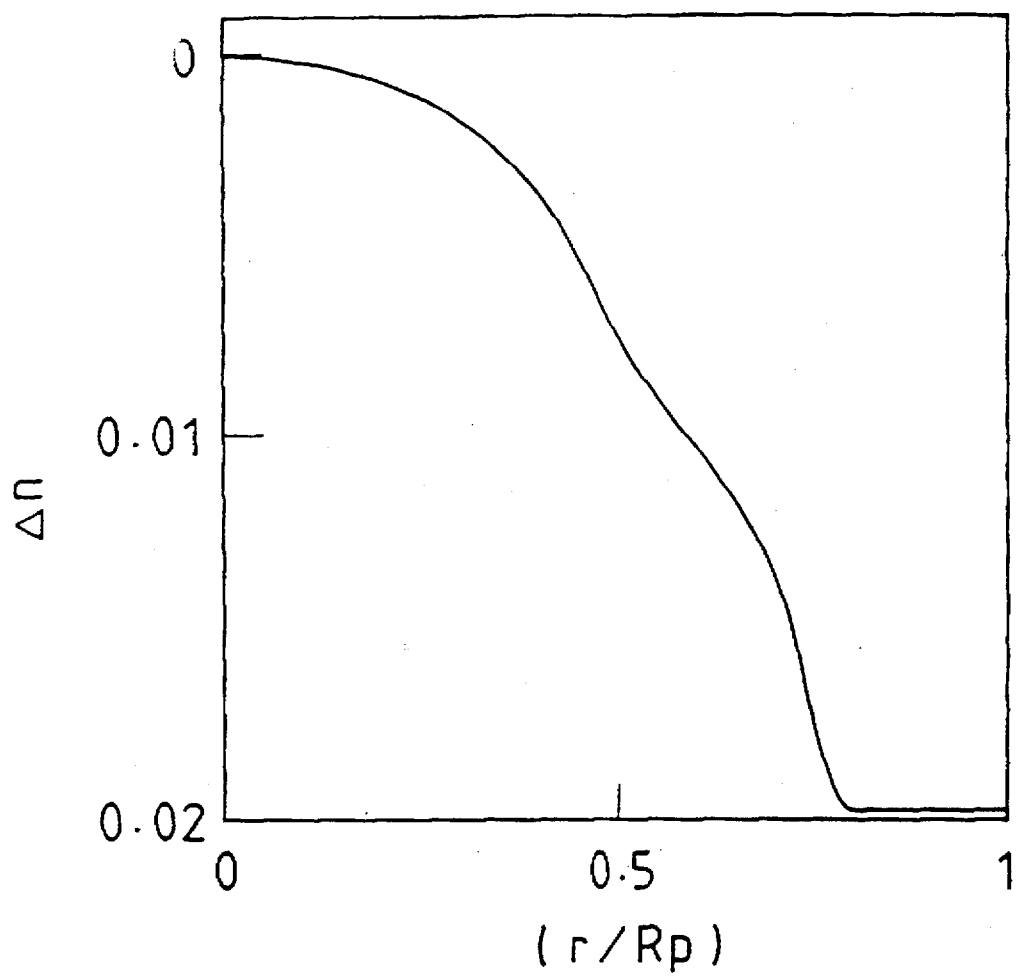

PROCESS FOR PRODUCTING OPTICAL RESIN MATERIALS WITH DISTRIBUTED REFRACTIVE INDEX

"This application is a divisional of application Ser. No. 08/078,179, filed Jun. 17, 1993, now U.S. Pat. No. 5,541,247.

TECHNICAL FIELD

The present invention relates to optical resin materials with distributed refractive index, processes for producing the materials, and optical conductors using the materials, and more particularly, to optical resin materials of which the refractive index has a gradient in a specific direction, processes for producing the materials, and optical conductors using the materials, which conductors include optical fibers, waveguides, optical integrated circuits, and base materials (preforms) therefor having distributed refractive indexes.

BACKGROUND ART

It is already known in the art to use optical resins as materials for optical conductors of distributed refractive index type, including optical fibers, optical waveguides, optical integrated circuits, and base materials (preforms) therefor.

The optical resins used for the optical conductors of distributed refractive index type are usually required to have a high level of transparency and an accurately controlled distribution of refractive index. For instance, in a distributed refractive index type optical fiber, it is necessary to form an accurately controlled radial distribution of refractive index in a resin material having a high level of transparency, in order to realize a broad transmission band and a low loss.

The techniques conventionally known for producing optical resin materials with distributed refractive index can be roughly classified into a copolymerization method and a diffusion method. None of the presently available techniques can produce optical resin materials that fully meet the above-mentioned requirements.

The copolymerization method is a method in which two or more different monomers are copolymerized. For example, Examined Japanese Patent Publication (KOKOKU) No. 54-30301 and Unexamined Japanese Patent Publication (KOKAI) No. 61-130904 disclose optical conductors having a refractive index gradient, which are produced by utilizing the copolymerization reaction of monomers having different reactivity ratios r1 and r2, and changing the proportion of the monomer units contained in the polymers generated in the early stage and the late stage of the polymerization.

This method makes use of the difference between the copolymerization reactivity ratios r1 and r2, and therefore, the greater the difference between the values of r1 and r2, the easier it becomes to produce a difference in refractive index; however, as the difference between the values increases, the monomers are more likely to be polymerized independently, compared with the rate of the copolymerization. As a result, phase separation unavoidably takes place between the reaction products. If fluctuation in the refractive index distribution is caused due to such phase separation, then a scattering loss occurs in the resulting optical conductor.

If an intensive phase separation occurs, it is observed as a cloudy phenomenon, which possibly makes it utterly impossible to use the material for applications including optical fibers, optical waveguides, and optical integrated circuits.

In addition, increasing the difference in the reactivity ratio between monomers causes a monomer having a lower reactivity to remain as monomer until the last stage of the polymerization process, and if the polymerization process is not complete, the resulting optical device is subject to change with time, which leads to deterioration of the characteristics.

In contrast with the copolymerization method, the diffusion method is a method wherein gel is produced from a monomer; another type of monomer is poured and diffused in the gel; and then the mixture is fully polymerized.

For example, according to a method proposed in Examined Japanese Patent Publication (KOKOKU) No. 52-5857, a polymer precursor (prepolymer gel), which has a transparent and three-dimensional crosslinked structure, is prepared first; then a monomer, which forms a polymer having a different refractive index, is diffused from outside; and the mixture is subjected to post-treatment to be fully polymerized and solidified, thereby producing an optical conductor having a distributed refractive index.

According to this method, however, it is necessary to prepare the polymer precursor in advance. In addition, the polymer precursor requires that the polymerization be interrupted in a middle stage of polymerization, but it is not easy to stop the polymerization reaction with good reproducibility at a stage where a certain conversion ratio is reached. Dispersion in the conversion ratio affect the subsequent monomer diffusion process, making it difficult to accurately control the distribution of refractive index of the optical conductor.

Furthermore, the polymer precursor, in order to maintain its shape, needs to be produced using a polyfunctional monomer which has crosslinking properties, or be produced as a copolymer composed of a monofunctional monomer and a polyfunctional monomer. However, a polymer containing a crosslinkable monomer tends to exhibit poor thermoplasticity, making the treatment after the polymerization difficult. This drawback is not negligible. Especially when producing an elongated optical conductor such as an optical fiber, this method is extremely disadvantageous in that a process involving hot drawing is hardly applicable.

DISCLOSURE OF THE INVENTION

The present invention provides a technique which basically requires only one type of monomer as the raw material monomer, unlike the prior art process wherein basically two or more types of monomers are indispensable as the materials. That is, an optical resin having a distributed refractive index is produced by a method based on a novel principle. Specifically, one or two or more types of monomers are prepared as the raw material or materials for an optical resin matrix; a substance with a different refractive index, which is virtually not involved in the polymerization reaction itself, is mixed in the material or materials; and the mixture is put in a polymerization container to which heat energy (heat) or light energy (ultraviolet radiation, etc.) is applied. The obtained optical resin is used for producing an optical fiber, light waveguide, optical integrated circuit, or a preform of such devices.

In other words, the inventor noted that the prior art techniques had an intrinsic problem in that they are intended to achieve refractive index distribution basically by the process of copolymerization, and found unique techniques which permit the formation of a distributed refractive index by a process which does not involve copolymerization.

The present invention provides optical materials of distributed refractive index type, which is not only free of various drawbacks of the prior art due to being dependent on the copolymerization process involving two or more types of monomers but enables the users to enjoy good transparency and controllability of refractive index distribution and economy, as well as processes for producing the materials, and high-quality optical conductors or preforms therefor using such optical resin materials.

More specifically, the present invention provides an optical resin, which comprises at least one type of polymer constituting a transparent polymeric resin matrix, and a substance which differs from the polymer in solubility parameter by 7 $(cal/cm^3)^{1/2}$ or less and in refractive index by 0.001 or more, the concentration of the substance having a gradient in a specific direction.

Further, the invention provides the following two methods as processes for producing such optical resins:

(A) A process for producing an optical resin with a distributed refractive index, of which the refractive index continuously changes in a specific direction. In this process, a mixed solution containing at least one type of polymerizable monomer or polymerizable monomer sol and at least one type of substance whose solubility parameter differs by 7 $(cal/cm^3)^{1/2}$ or less and refractive index by 0.001 or more from those of the polymer generated by the polymerization of the monomer is filled in a polymerization container, and the polymerization container filled with the mixture is heated or is irradiated with energy rays from outside so that polymerization reaction starts and progresses preferentially from a particular region, whereby a concentration gradient is formed in the at least one type of substance through the polymerization reaction.

(B) A process for producing an optical resin with a distributed refractive index, of which the refractive index continuously changes in a specific direction. In this process, a mixed solution containing at least one type of polymerizable monomer or polymerizable monomer sol and at least one type of substance whose solubility parameter differs by 7 $(cal/cm^3)^{1/2}$ or less and refractive index by 0.001 or more from those of the polymer generated by the polymerization of the monomer is filled in a container made of a polymer, and the container filled with the mixture is heated or is irradiated with energy rays from outside while the polymer forming the container is allowed to swell and dissolve in the mixed solution from an inner wall thereof so that polymerization reaction starts and progresses preferentially from a particular region, whereby a concentration gradient is formed in the at least one type of substance through the polymerization reaction.

Specifically, in the process (A), methyl methacrylate (MMA) or the like, which is a polymerizable monomer, and bromobenzene or the like, which is a compound with a different refractive index and virtually has no reactivity with respect to the polymerizable monomer, are poured in a polymerization container such as a polymerization tube, together with benzoyl peroxide, which is a thermal polymerization radical initiator, or benzoin methyl ether, etc., which is an ultraviolet radical polymerization initiator, and normal butyl mercaptan, etc., which is a chain transfer agent, at a suitable proportion, and then polymerization reaction is allowed to start and progress by applying heat or energy such as ultraviolet rays to the polymerization tube from outside.

The substance with different refractive index, having no reactivity, is not directly involved in the polymerization reaction itself for forming the polymeric resin matrix, but it forms a content distribution such that the content gradually increases from, e.g., the inner wall toward the center of the polymerization tube (polymerization container), through the polymerization reaction process. This makes it possible to obtain an optical synthetic resin material of distributed refractive index type whose refractive index increases in the radial direction from the periphery toward the center thereof.

The polymerization container used in this method may be of ordinary glass or other non-soluble material, and the container may be manufactured in advance.

The process (B) is characterized by the use of a polymerization container made of a polymer which swells and dissolves from the inner wall of the container into the aforesaid mixed solution, the dissolved substance turning into a monomer when it contacts the mixed solution in the container. Specifically, the swelling and dissolving phenomenon of the polymerization container takes place simultaneously with the phenomenon wherein the monomer turns into a polymer and separates out from the inner wall of the polymerization container. This makes it possible for the substance with different refractive index to form a steeper concentration gradient than in the case of using the aforesaid polymerization container which does not swell and dissolve.

Thus, the process (B) is suited for producing an optical resin of distributed refractive index type which has a relatively large refractive index gradient.

Further, according to another aspect of the present invention, an optical resin with still higher transparency is provided, when the H atom of the carbon-hydrogen bond (C—H bond), which the substances (the monomer and the substance with different refractive index to be mixed in the monomer) used in the aforementioned processes have, is replaced by a D atom (deuterium atom), to thereby eliminate the absorption loss attributable to the vibration mode of the expansion and contraction of the C—H bond, which takes place in a region of visible light or near infrared light.

Furthermore, the present invention provides optical conductors such as optical fibers which use the optical resin materials of distributed refractive index type produced by the aforementioned processes. Elongated optical conductors such as optical fibers can be produced by hot-drawing the optical resin materials of distributed refractive index type.

The refractive index profile of an optical fiber produced by the present invention shows an accurately controlled smooth curve; therefore, an optical fiber of distributed refractive index type with an excellent band characteristic, (GI type or graded index type) i.e., a transmission band which is twice or more as wide as that of an SI type (step index type) optical fiber having the same relative refractive index difference $\Delta$, can be obtained.

Further, it is possible to obtain optical fibers having various refractive index distributions, by controlling the relative refractive index difference $\Delta$ or the steepness of the concentration gradient of the substance with different refractive index.

For instance, a multi-mode optical conductor can be obtained where the refractive index profile of the core of an optical fiber is given by the following formula (1), and the value of $\alpha$ in the formula has a wide range covering from 0.6 to 6:

$$n(r)=n_0[1-2\Delta(r/Rc)^\alpha]^{0.5}$$

$$0 \leq r \leq Rc \text{ (core)} \qquad (1)$$

where $\alpha$ is the coefficient of the refractive index distribution; r, the distance from the center axis of the core; $n_0$, the refractive index at the center axis of the core (r=0); and Rc, the radius of the core.

Further, Δ is the relative refractive index difference which is expressed by the following formula (2):

$$\Delta = (n_0^2 - n_1^2)/2n_0^2 \qquad (2)$$

where $n_1$ is the refractive index at the boundary between the clad and the core. The boundary area is usually a portion having the lowest refractive index in an optical fiber. The refractive index of the clad has a fixed value equal to or greater than $n_1$, or has a constant distribution.

When α takes a value falling within the above-mentioned range, the transmission band of a synthetic resin optical fiber of distributed refractive index type obtained by the present invention increases by about 11 to 1000 times as compared with now commercially available optical fibers made of polymer materials.

Still another aspect of the present invention includes applying gamma rays or the like to the distributed refractive index type optical resin of which polymerization reaction has been completed, or to an optical device made of such resin, as a post-treatment, to effect crosslinking reaction. This enables the production of an optical conductor of distributed refractive index type which is excellent in heat resistance.

As will be understood from the brief description given above, according to the basic techniques used in the processes of the present invention, an optical resin material of distributed refractive index type is produced by following the step of filling a polymerization container, having a predetermined size and shape and made of a predetermined material, with a mixed solution containing a monomer and a substance with a different refractive index, which is not involved in the polymerization, the step of adding a radical polymerization initiator, a chain transfer agent, etc., which are necessary for controlling the polymerization reaction, and the step of heating the mixture from a predetermined part of the polymerization container or the step of irradiating energy such as ultraviolet rays from a predetermined direction or the step of carrying out both the heating and the energy irradiation as required, in order to trigger and promote polymerization reaction in order.

Furthermore, in addition to the above basic aspects, the present invention provides another aspect based on the technical concept characterized by replacing the H atoms in the materials with D atoms, thereby further enhancing the transparency of a distributed refractive index type optical resin to be produced.

This aspect makes it possible to produce broad-band, low-loss optical conductors such as optical fibers from optical resin materials of distributed refractive index type having a high level of transparency.

According to a further aspect of the present invention, gamma rays or the like are applied to the distributed refractive index type optical resin of which polymerization reaction has been completed, or to an optical conductor made of such resin, as a post-treatment, to effect crosslinking reaction. This makes it possible to obtain optical conductors of distributed refractive index type which have high resistance to heat and thus are less subject to thermal deformation.

The following is a detailed description of the present invention, which is divided into eight parts: [1] Polymerizable Monomers and Substances with Different Refractive Index through [8] Post-treatment (crosslinking), for convenience's sake.

[1] Polymerizable Monomers and Substances with Different Refractive Index

Regarding the polymerizable monomer and the substance with a different refractive index to be mixed, the present invention requires that the difference between the solubility parameter of the polymer, which is generated by the polymerization of the monomer, and the solubility parameter of the substance with a different refractive index be 7 (cal/cm$^3$)$^{1/2}$ or less and that the difference in refractive index be 0.001 or more.

There are a great number of combinations of materials by which the above requirements can be met. For instance, the polymerizable monomer may be selected from those listed in Table 1, and the substance with different refractive index from those listed in Table 2.

In addition, as long as the difference in refractive index with respect to the polymer forming the polymeric resin matrix obtained by the polymerization reaction of the polymerizable monomer is 0.001 or more, polymers or oligomers generated from the polymerizable monomers shown in Table 1 may be used as the substance with different refractive index for producing a refractive index profile, like the substances listed in Table 2.

Further, instead of the polymers or oligomers obtained through the polymerization of the polymerizable monomers shown in Table 1, macro-molecular or "medium-molecular" compounds of ester acrylate, ester methacrylate, ethylene glycol monoacrylate or ethylene glycol monomethacrylate polymers, oligomers or the like may be used as the substance to be mixed for producing a refractive index profile, as long as they satisfy the required difference in solubility parameter, 7 (cal/cm$^3$)$^{1/2}$ or less, and the required difference in refractive index, 0.001 or more. (Here, the compounds of "medium molecules" mean compounds having a molecular weight of up to approximately 2000, while the polymers refer to compounds having a molecular weight over 2000.)

Likewise, the substances with different refractive index are not limited to those listed in Table 2; the following, for example, may also be used:

Dibenzyl ether (refractive index n=1.562),

Phenoxy toluene (n=1.573), 1,1-bis-(3,4-dimethyl phenyl) ethane (n=1.564)

Diphenyl ether (n=1.579)

Biphenyl (n=1.587 [at 75° C.])

Diphenyl sulfide (n=1.633)

Diphenylmethane (n=1.577)

Dioctyl phthalate (n=1.486)

Dioctyl phthalate has a relatively low refractive index, and therefore, it is one of the substances with different refractive index which are suited for producing light divergent optical conductors by a method wherein the substance with different refractive index is distributed so that the concentration is higher at the central part of the polymerization container.

TABLE 1

| Monomer | Refractive index (polymer) | Solubility parameter (polymer; cal/cm$^3$)$^{1/2}$ |
| --- | --- | --- |
| 2,2,2-trifluoroethyl methacrylate | 1.420 | 7.8 |
| Methyl methacrylate | 1.492 | 9.2 |
| 4-methyl cyclohexyl methacrylate | 1.4975 | 9.16 |
| Cyclohexyl methacrylate | 1.5066 | 9.04 |
| Furfuryl methacrylate | 1.5381 | 9.93 |
| 1-phenylethyl methacrylate | 1.5487 | 9.29 |
| 1-phenylcyclohexyl | 1.5645 | 8.91 |

TABLE 1-continued

| Monomer | Refractive index (polymer) | Solubility parameter (polymer; cal/cm³)$^{1/2}$ |
|---|---|---|
| methacrylate | | |
| Benzyl methacrylate | 1.5680 | 9.54 |
| Phenyl methacrylate | 1.5706 | 9.65 |

TABLE 2

| Substance (with different refractive index) | Refractive Index | Solubility Parameter (cal/cm³)$^{1/2}$ |
|---|---|---|
| Benzyl phthalate-n-butyl | 1.575 | 9.64 |
| 1-methoxyphenyl-1-phenylethane | 1.571 | 9.74 |
| Benzyl benzoate | 1.568 | 10.7 |
| Bromobenzene | 1.557 | 9.9 |
| o-dichlorobenzene | 1.551 | 10.0 |
| m-dichlorobenzene | 1.543 | 9.9 |
| 1,2-dibromoethane | 1.538 | 10.4 |
| 3-phenyl-1-propanol | 1.532 | 11.4 |

The mixing ratio of the substance with a different refractive index to the polymerizable monomer should be determined in consideration of the value of the refractive index of the substance with different refractive index, the steepness of the gradient of the refractive index profile which is required for the resulting optical resin, the mechanical strength and transparency required for the optical resin, etc. As a practical standard, for 99 wt % (percent by weight) to 50 wt % of the polymerizable monomer, the substance with different refractive index may be mixed in a range of 1 wt % to 50 wt %. More preferably, the substance with different refractive index is mixed in a range of 5 wt % to 30 wt % based on 95 wt % to 70 wt % of the polymerizable monomer.

The solubility parameter is a thermodynamic quantity which is generally defined as the square root $(\Delta E/V)^{1/2}$ of a value (cohesive energy density) obtained by dividing the molar evaporation energy $\Delta E$ of a liquid by a molar volume V. This quantity is also used in the field of polymers, and its value provides a criterion for determining the occurrence of phase separation (which leads to cloudy appearance of an optical resin) in a multi-component compatible system.

Specifically, provided that the solubility parameters of the polymer and the substance with different refractive index are $\delta p$ and $\delta c$, respectively, if the difference $|\delta p - \delta c|$ is large, then they tend to develop phase separation which leads to the cloudy phenomenon. Since the present invention is intended to provide optical resin materials, it requires that the condition expressed by the formula below be satisfied to obtain transparent materials:

$$|\delta p - \delta c| \leq 7 (cal/cm^3)^{1/2}$$

The present invention also specifies a certain difference in refractive index (0.001 or more) between the polymeric resin matrix and the compatible substance (substance with different refractive index). This establishes values necessary for achieving the gradient and magnitude (difference between the maximum and minimum refractive indexes) of refractive index distribution, which are essential for an optical material of distributed refractive index type, by means of the concentration distribution in the resultant optical resin material.

One of the important features of the present invention is that optical conductors such as optical fibers, light waveguides, and single-focus or multi-focus lenses, which have a high level of transparency and a sufficient difference in refractive index or gradient that are not attained with conventional optical resins, can be obtained by satisfying the condition for the solubility parameters and the condition for the difference in refractive index at the same time.

[2] Radical Polymerization Initiator

The radical polymerization initiator to be used for the polymerization reaction in the processes according to the present invention should preferably be selected appropriately depending on the form of energy applied to the reaction system. For instance, for heat polymerization or infrared polymerization, peroxides such as benzoyl peroxide (BPO) may be used, while benzoin methyl ether (BME) etc. may be used for ultraviolet polymerization.

[3] Energy Application for Polymerization Reaction and Formation of Distributed Refractive Index In the present invention, there is no particular limitation on the types of energy to be applied for the polymerization reaction for producing a polymeric resin matrix. In general, however, heat polymerization using heat energy or polymerization by means of the irradiation of energy rays may be employed.

Energy rays to be applied include ultraviolet rays, infrared rays, gamma rays, electron rays, neutron rays, heavy charged particle rays, and microwave rays. These energy rays differ in transmission power and polymerization promoting power; therefore, as is discussed later, the type, strength, and incident direction (or their time-dependent change) of energy rays and a radical polymerization initiator are suitably selected to thereby control the refractive index profile of an optical resin to be produced.

First, the most common example will be described, wherein a glass tube is used as the polymerization container, and energy rays are radiated from outside of the glass tube to start polymerization from a region in the vicinity of the inner wall of the glass tube.

When a radical polymerization initiator or the like is added to a mixed solution of the polymerizable monomer and the substance with different refractive index which is not involved in the polymerization, and energy rays such as infrared rays are applied, the radical polymerization initiator generates a radical, thus starting the polymerization reaction. Under a normal condition wherein the energy density is the highest near the inner wall, the polymerization reaction begins in the vicinity of the inner wall of the glass tube and gradually progresses toward the central part. As a result, a high conversion area is formed near the inner wall of the glass tube and the polymer is preferentially separated out in the area, occupying a majority of the volume of the outer part.

On the other hand, the polymerization reaction slowly progresses at the central part of the glass tube, and, therefore, the substance with different refractive index, which was near the inner wall when the reaction started, gradually moves and gathers at the central part, taking the form of a concentrated mixed solution. In the last stage of the polymerization reaction process, the polymerization reaction reaches the central part, while the concentration of the substance with different refractive index is significantly high at the central part.

Accordingly, when the polymerization reaction is completed, the concentration of the substance with different refractive index is distributed so that the concentration is high at the central part and gradually decreases toward the periphery. If the substance with different refractive index has a greater refractive index than the polymeric resin matrix, the high refractive index provides relatively large contribution in the high-concentration area, thereby producing an area with a higher refractive index compared with the low-concentration area. It is needless to say that, if the substance with different refractive index has a lower refractive index than the polymeric resin matrix, then the relationship between the refractive index distribution and the concentration distribution of the substance with different refractive index is reversed.

Using the process described above, it is possible to produce an optical resin of distributed refractive index type, by selecting a substance having a high refractive index as the substance with different refractive index. The optical resin obtained is then used as a preform and subjected to hot drawing to obtain an optical conductor with a distributed refractive index.

Thus, when energy rays with a relatively low penetrating power are applied from outside of the polymerization container, the substance with different refractive index tends to gather at the central part. If the energy is concentrated only on the surrounding area until the polymerization reaction has progressed to a considerable degree, the tendency is further enhanced, and a relatively steep refractive index gradient is formed in a narrow region.

In contrast with the above, if energy rays with a relatively high penetrating power are applied from every direction toward the central part of the polymerization container (the polymerization container is, in many cases, rotated), the substance with different refractive index tends to be distributed, spreading toward the peripheral area, and a gentle refractive index gradient is obtained. Furthermore, if, for example, microwave energy is concentrated on the central part, it is theoretically possible to form a region having a higher concentration of the substance with different refractive index in the peripheral area than in the central part. Naturally, in this case, the resultant refractive index gradient formed is in the opposite direction to that formed in the standard case.

[4] Polymerization Container

The most commonly used polymerization container is a tube of glass as mentioned above, but various other types are conceivable in terms of shape, dimensions, and material.

The shape and dimensions of the polymerization container determine the shape and dimensions of an optical resin of distributed refractive index type which is to be obtained upon completion of the polymerization reaction; therefore, the configuration of the container may be selected according to desired shape and dimensions. For instance, when producing an optical fiber by hot-drawing a preform, it is reasonable to select a container, the inner wall of which has a shape matching the shape and dimensions of the preform.

Possible shapes other than the tubular or cylindrical shape include sphere, parallelepiped, cone, trigonal-pyramid, and U-shape. In general, however, the shape should be utterly optional. Basically, there are no restrictions on dimensions; therefore, it is desirable to select dimensions that are advantageous for a working process for obtaining an optical conductor, which is the final product upon completion of the polymerization. For instance, containers of extremely small dimensions may be used for optical devices such as light emitting diodes, semiconductor lasers, and waveguide devices, while large-sized containers may be prepared for producing large-sized lens devices or light guides to be incorporated in solar systems.

Regarding the material of the polymerization container, if the container is to be used in the aforementioned process (A), a material which does not have reactivity or solubility with respect to a mixed solution of the polymerizable monomer and the substance with different refractive index, and additives such as the polymerization initiator should be selected. It is of course desirable that the material selected should allow smooth penetration or transmission of energy to be used, from the standpoint of energy efficiency during the polymerization reaction.

As previously mentioned, in the case of the polymerization container used in the process (B), polymer materials which exhibit bloating tendency with respect to monomers are used.

When a monomer solution containing the substance with different refractive index and the radical polymerization initiator is poured in a tubular container made of, e.g., a polymer, the inner wall of the container, which is in contact with the monomer solution, swells as time elapses. As a result, a laminar swollen phase is formed in the inner wall region. The concentration of the polymer in the swollen phase layer is not uniform; the concentration of the polymer eluted from the polymerization tube gradually decreases toward the central part with distance from the inner wall of the polymerization tube. This means that a distributed concentration of the polymer is formed in the swollen phase.

In this state, when energy rays are applied from outside of the polymerization tube, the radical polymerization initiator generates a radical, and the polymerization reaction is started from the vicinity of the inner wall of the polymerization tube, as in the case where a glass tube is used. In this case, the swollen phase layer, which is the polymer eluted into the monomer solution, exists, and the layer has good compatibility with the polymer; therefore, the polymer begins to separate out in a stage where the conversion ratio of the whole reaction system is still relatively low.

This early separating phenomenon is remarkable especially in a region with a high concentration of eluted polymer in the swollen layer, thus forming a gradient of concentration of the substance with different refractive index that remains in the separated polymer. As the conversion ratio of the whole system increases, the unconverted monomer solution containing the concentrated substance with different refractive index gathers at the central part. At the end of the polymerization reaction process, the monomer polymerizes while the substance with different refractive index having a considerably high concentration coexists, thus forming a polymeric resin matrix.

Generally speaking, since the polymer is separated in an early stage due to the generation of the swollen phase layer, the polymer starts to separate out from a region in the vicinity of the inner wall of the polymerization container with higher priority than it would in the case where a glass or other polymerization container, which does not swell, is used, thus accordingly producing a greater difference in the concentration of the substance with different refractive index between the vicinity of the inner wall and the central part of the container. In other words, the value of the peak (or the depth of the valley) of the refractive index distribution curve of the optical resin material obtained increases.

[5] Solation of Polymerizable Monomer

As a means for steepening the gradient of the refractive index, in addition to the method wherein a polymer polymerization container is used as described in [4], there is a method wherein a polymerizable monomer is solated in advance.

Solating the polymerizable monomer before the polymerization reaction is started causes polymer separation to occur in an earlier stage and also makes it difficult to mix with the substance with different refractive index, thus forming a greater gradient in the concentration of the substance with different refractive index. Accordingly, performing solation beforehand also makes it possible to increase the value of the peak height (or the depth of the valley) of the curve of the refractive index distribution.

[6] Deuteration

It is desirable that the transparency, i.e., transmittancy, of an optical resin material of distributed refractive index type be especially high in the operating wavelength of an optical device made of the material. If the resin material is used, however, optical absorbance attributable to the expansion and contraction mode of the carbon-hydrogen bond (C—H bond) unavoidably occurs, and the absorbance peak wavelength is in some cases coincides with the operating wavelength. The absorption wavelength, which corresponds to the basic mode of the C—H bond expansion and contraction vibration, is 3390 nm, while the absorption wavelengths which correspond to the fourth harmonic, the fifth harmonic, the sixth harmonic, and the seventh harmonic are 901 nm, 736 nm, 627 nm, and 549 nm, respectively. The wavelengths corresponding to the fourth, fifth, sixth, and seventh harmonics fall within the wavelength region which is mainly used in the optical communication field. When materials having the C—H bond are used to produce optical conductors, the theoretical threshold transmission loss is 37 dB/km when λ=516 nm, 35 dB/km when λ=568 nm, and 106 dB/km when λ=580 nm. So far, approximately 0.20 dB/km (λ≅1300 nm) has been achieved with a quartz optical fiber, and the above transmission loss values cannot be said to be of satisfactory level.

Where the C—H bond owned by the molecules of the optical resin material according to the present invention is replaced by C—D bond, the absorption peaks at 3390 nm of the basic mode, and at 901 nm, 736 nm, 627 nm, and 549 nm of the fourth, fifth, sixth and seventh harmonics, respectively, disappear; instead, the absorption peaks appear at 4484 nm, 808 nm, 704 nm, and 626 nm, corresponding to the basic mode, the sixth harmonic, the seventh harmonic, and the eighth harmonic, respectively.

In this case, compared with the case of the C—H bond, the absorption wavelength band is shifted toward a longer wavelength side; therefore, the orders of the harmonics at absorption peaks below a near infrared region (approximately 750 nm or less), where a major problem occurs in practical use, are greater than in the case of the C—H bond, and hence no strong absorption occurs. The theoretical threshold transmission loss values are 9.1 dB/km when λ=680 nm, 14 dB/km when λ=780 nm, and 39 dB/km when λ=850 nm, showing drastically improved values compared with the case of the C—H bond.

To obtain an optical resin material with its C—H bond replaced by C—D bond, an MMA-d8 monomer with its H atom replaced by a D atom, for example, may be used for the polymerization to obtain a resin. Needless to say, a substance with different refractive index which does not contain an H atom should preferably be used.

[7] Transmission Band

When optical fibers are to be used for communications, it is naturally required that the transmission loss be minimized because optical signals are transmitted over a long distance. It is a well-known fact that a wide transmission band is an important factor for attaining high-speed transmission of a vast amount of information. The transmission band of a single-mode optical fiber made of a quartz material, which is presently available and commonly used for a communication trunk line, is about some tens of GHz·km.

On the other hand, an optical fiber made of a commercially available polymer material comes only in the multimode step-index type (multimode SI type), and its transmission band is extremely narrow, about 5 MHz·km in terms of a calculated value and 6 MHz·km in terms of an measured value (Δ=0.057). The transmission band of the multimode optical fiber depends on the difference in refractive index between the core and the clad, but it also greatly depends upon the distribution profile of the refractive index.

The influence exerted by the profile of refractive index distribution on the transmission band will now be discussed.

According to the expression usually used for studying the characteristics of an optical fiber of distributed refractive index type, the refractive index distribution in the core region is expressed in terms of the aforesaid formula (1). This is expressed as:

$$n(r) = n_0[1 - 2\Delta(r/Rc)^{\alpha}]^{0.5} \quad (1)$$

$$0 \leq r \leq Rc \text{ (core region)}$$

where $\alpha$ is the coefficient of the refractive index distribution; $r$ the distance from the center axis of the core; $n_0$ the refractive index at the center axis of the core (r=0); Rc the radius of the core, $\Delta$ the relative difference in refractive index which is expressed in the formula (2) as previously mentioned. Like the formula (1), the formula (2) can be rewritten as shown below:

$$\Delta = (n_0^2 - n_1^2)/2n_0^2 \quad (2)$$

where $n_1$ is the refractive index at the boundary between the clad and the core. It is already mentioned that this boundary area normally has the lowest refractive index in an optical fiber, and that the refractive index of the clad has a fixed value equal to $n_1$ or greater than $n_1$ or has a constant distribution.

How the refractive index distribution changes with the value of $\alpha$ is shown in FIG. 1. "A" through "F" in the figure correspond to the following values of $\alpha$:

A: $\alpha=0.5$
B: $\alpha=1.0$
C: $\alpha=2.0$
D: $\alpha=5.0$
E: $\alpha=10.0$
F: $\alpha=\infty$ "Rp" denotes the radius of the optical fiber including the clad.

The case F: $\alpha=\infty$ represents the step-index type.

In this case, it is known that the following relationship holds between the impulse response, which is directly related to the width of the transmission band, and the value of $\alpha$. In the formula, T denotes the impulse response spreading time which is the difference in group delay from the lowest-order mode to the highest-order mode.

When $\alpha \neq 2$, $$H(\tau) = [(\alpha+2)/\alpha] \cdot [\tau^{\alpha/2}/T^{(\alpha+2)/\alpha}] \quad (3)$$

where $T = (N_1/c)\Delta \cdot [(\alpha-2)/(\alpha+2)]$.
When $\alpha=2$, $$H(\tau) = [1/T] \quad (4)$$

where $T = (N_1/c) \cdot (\Delta^2/2)$.

Furthermore, the $\alpha$ value which provides a maximum transmission band can be given by the following formula (5):

$$\alpha opt = 2 + 2.4\Delta \tag{5}$$

When one of the typical values, 0.01, for $\Delta$ in the optical conductor of distributed refractive index type according to the present invention is substituted, $\alpha opt$ is 2.02.

From a practical viewpoint, the transmission band shows significant improvement as the value of $\alpha$ is closer to 2. Further, when the result of the calculation performed by substituting the right side of the formula (5), which shows the optimum value of $\alpha$, into the right side of the formula (3) is compared with the impulse response in the case of $\alpha=\infty$ (SI type), the ratio of the group delay between them is $\Delta/2$. In other words, when $\Delta$ takes a normal value, the difference in group delay with respect to $\alpha opt$ is reduced to about $1/200$ of the case of the SI type. This means that the distortion of input optical signal waveform, which occurs during optical transmission, is extremely small.

Furthermore, when a maximum value fmax of the transmission speed of the input optical pulses is calculated under the condition of a normal $\alpha opt$ value which is assumed for the refractive index, the result of calculation shows $1.722/\Delta^2$ [Mb·km/sec]. When 0.01 is substituted for $\Delta$, the result is 17.22 [Gb·km/sec].

A transmission band f3dB (frequency that gives 3 dB attenuation) can be expressed by the following formula (6); therefore, f3dB=2.4 GHz·km when $\alpha=2$ and $\Delta=0.01$. This value is 1140 times the value of the transmission band (theoretical, calculated value) of a commercially available SI type optical fiber ($\alpha=\infty$; $\Delta=0.057$).

$$f3dB = 0.6/T \tag{6}$$

When a $\cong 10$ is assumed to represent a case where $\alpha$ deviates considerably from the optimum value, and the maximum transmission speed fmax is estimated from the value of the difference in group delay, then the maximum transmission speed fmax is 0.129, and the transmission band f3dB is 18 MHz·km. This is 1.5 times the value of the SI type optical fiber having the same relative difference of refractive index $\Delta$, or 8.6 times the value of a commercially available SI type optical fiber.

Thus, even when the value of $\alpha$ is considerably large, the transmission band can be improved compared with the case of an SI type optical fiber.

Also, even if the value of $\alpha$ shifts from the optimum value to a smaller value, similar improvement of the transmission band can be attained. If the difference in group delay when $\alpha=1$, for example, is determined without changing the condition of the difference in refractive index, the value is one third of that of the SI type. Further, even when $\alpha=0.1$, the value is 0.9 times, and it becomes 6.3 times when the condition of the difference in refractive index of a commercially available polymer optical fiber is applied.

When a range in which the transmission band is twice or more as wide as that of the SI type is determined with the difference in refractive index unchanged, the result is approximately $0.67 \leq \alpha \leq 6$.

[8] Post-treatment (Crosslinking)

After completing the polymerization reaction for producing a polymeric resin matrix, when the necessary hot drawing or other process have been completed to finish the product, crosslinking reaction is triggered by applying gamma rays, electron rays or the like, as the post-treatment, to produce an optical conductor with high heat resistance. This post-treatment also is a technical matter which should be considered as one of inventive conceptions of the present invention.

When an optical conductor of distributed refractive index type is produced using the materials mentioned in the explanation of Table 1 and Table 2 and according to the process (A) or (B) of the present invention, the polymeric chains constituting the polymeric resin matrix are not virtually crosslinked; therefore, the product may be deformed if used at high temperatures.

Therefore, when the optical conductor is expected to be used at high temperatures, in the aforesaid manufacturing process (A) or (B), a monomer which has a crosslinkable radical that triggers crosslinking reaction by the irradiation of gamma rays, for example, is used as the polymerizable monomer, and the crosslinking reaction by means of the irradiation of gamma rays is implemented after the optical conductor is produced, thus improving the heat resistance.

For example, one of desired crosslinkable radicals for this use is the epoxy radical such as a glycidyl radical, etc.

For monomers, which are considered to be effective in the post-treatment according to the present invention and have crosslinkable radicals, glycidyl (meta-)acrylate, β-methyl glycidyl (meta-)acrylate, allyl glycidyl ether, and p-vinyl benzoic glycidyl can firstly be enumerated as vinyl monomers having the aforesaid glycidyl radical.

Further, epithio (meta-)acrylate, dicyclo bentynyl (meta-)acrylate, 2-(p-vinylphenyl) propylene oxide, 4-vinyl epoxy cyclohexane, 6-vinyl epoxy norbornane, 6-ethylidene epoxy norbornane, vinyl cinnamate, α-cyanocinnamate vinyl, vinyl cinnamylidenepyruvate, and (meta-)cinnamyl acrylate may be used, as well as vinyl monomers having isophorone radicals.

The above are typical examples; however, from the standpoint of the principle, monomers having any crosslinking radicals may be used, as long as the requirements that the radicals be inactive during the polymerization reaction process by which a polymeric resin matrix is formed and that the crosslinking reaction will not be initiated before application of crosslinking reaction exciting energy following completion of the polymerization or completion of the subsequent hot drawing can be met.

In other words, the crosslinking reaction is excited by using energy different from that used for the polymerization reaction for producing the polymeric resin matrix.

For example, if the polymeric resin matrix is formed by thermal radical polymerization, it is possible to implement crosslinking reaction by irradiating the resin with electron rays, or by irradiating with ultraviolet rays, etc.

As one of the types of crosslinking reaction to be achieved by the irradiation with ultraviolet rays, there is a method using a photocation crosslinking initiator. To carry out this method, a suitable amount (usually, 1 to 5 wt %) of the photocation crosslinking initiator is added to the material monomer for forming the polymeric resin matrix. There is no particular restriction on the type of the photocation crosslinking initiator to be used, and those initiators known in the art may be selected appropriately. Specific examples include aryl diazonium salt, diallyl iodonium salt, triaryl sulfonium salt, triaryl selenium salt, dialkylphenacyl sulfonium salt, dialkyl-4-hydroxysulfonium salt, sulfonate ester, iron-allene compounds, and silanol-aluminum complexes.

It is of course possible to excite the crosslinking through the radical reaction by ultraviolet rays or visible light. In this case, the crosslinking reaction can be speeded by using an optical initiator.

When light energy such as ultraviolet rays or visible light is used, however, care should be taken because excessive light intensity may lead to a coloring phenomenon.

Attention should also be paid to the fact that the dimensions (or diameter) suitable for the post-treatment varies depending on the penetrating power of energy rays to be applied. For instance, in hot-drawing preform into an optical conductor, there is no restriction on the dimensions of the preform itself, but, if the optical conductor is too thick after being hot-drawn, this may cause poor crosslinking reaction. In particular, ultraviolet rays, electron rays, etc. have low penetrating power, and therefore, this should be taken into account. In the case of ultraviolet rays, the diameter of the material should not exceed 20 mm. The diameter of the material that allows ultraviolet rays of normal wavelength and intensity to fully penetrate to the central part of the material is approximately 3 mm; a diameter of 1 mm or less is particularly preferable.

Several examples relating to the energy to be applied have been described above. In general, however, the type of energy to be used and the irradiating conditions should be determined considering all factors including the composition, dimensions and molecular weight of a polymer, the content of crosslinkable radical, etc.

In the present invention, it is considered practical to effect the crosslinking by means of gamma rays or electron rays among various radiations, in view of the conditions such as the type of monomer material to be used normally.

Details of the present invention are as described above, and some supplementary explanation will now be given.

First, the present invention imposes no limitation on simultaneous selection or combination of a plurality of types of monomers as the materials for a polymeric resin matrix, types of the substances with different refractive index, types or conditions of the energy to be applied, and the radical polymerization initiators to be selected according to the other factors.

Further, attention should be directed to the fact that, by suitably selecting and combining the above factors, various requirements for optical resins to be produced such as the optical properties (refractive index distribution, transparency, spectral transmission characteristics, resistance to radiation damage, etc.), mechanical properties (strength, rigidity, etc.), and chemical and thermal properties (resistances to chemicals, humidity and heat, the coefficient of thermal expansion, etc.) can be met.

Secondly, in the description of the present invention including the embodiments described later, radical polymerization is mentioned as the type of polymerization reaction to be used. This, however, does not mean to limit the invention, but it merely reflects the technical background that radical polymerization employing thermal or optical energy is industrially most commonly used. Accordingly, the invention has no difficulty in using any polymerization methods including anion polymerization and cation polymerization, in addition to radical polymerization.

The post-treatment by means of crosslinking is normally carried out to increase heat resistance; however, it does not particularly exclude the use of an optical conductor, which has undergone post-treatment by crosslinking, even under conditions where high temperature is not predicted.

BRIEF DESCRIPTION OF DRAWINGS

FIG. 20 is a graph showing the refractive index distribution of a GI type optical fiber produced using MMA and polybenzyl methacrylate.

BEST MODE OF CARRYING OUT THE INVENTION

A best mode of carrying out the present invention will now be described with reference to several embodiments.
<Embodiment 1>

A glass tube, having an inner diameter of 10 mm and held horizontally, was filled with methyl methacrylate (MMA), 0.5 wt % (percent by weight) benzoyl peroxide (BPO), and 0.15 wt % normal butyl mercaptan (nBM). Both ends of the tube were sealed, and then the tube was placed in an oven at 80° C. for heat polymerization while being rotated at 1000 rpm, thereby producing a polymethyl methacrylate tube (PMMA polymerization tube) having an outer diameter of 10 mm, an inner diameter of 6 mm, and a molecular weight of about 100,000.

The PMMA polymerization tube was held horizontally and was filled with a mixed solution containing a polymerizable monomer and a substance with a different refractive index. The polymerizable monomer used was methyl methacrylate (MMA); the substance with different refractive index used was bromobenzene (BB); and the mixing ratio was 4:1 (weight ratio). After adding 0.3 wt % benzoin methyl ether (BME) as a radical polymerization initiator and 0.15 wt % normal butyl mercaptan (nBM) as a chain transfer agent, both ends of the tube were sealed, exercising due care so that there were no bubbles left inside. While the tube was rotated at a speed of 30 rpm, ultraviolet rays were applied thereto, using a normal UV light source, thereby letting polymerization take place. About 8 hours were spent to produce a rod-shaped synthetic resin having an outer diameter of 10 mm.

Figure 1:
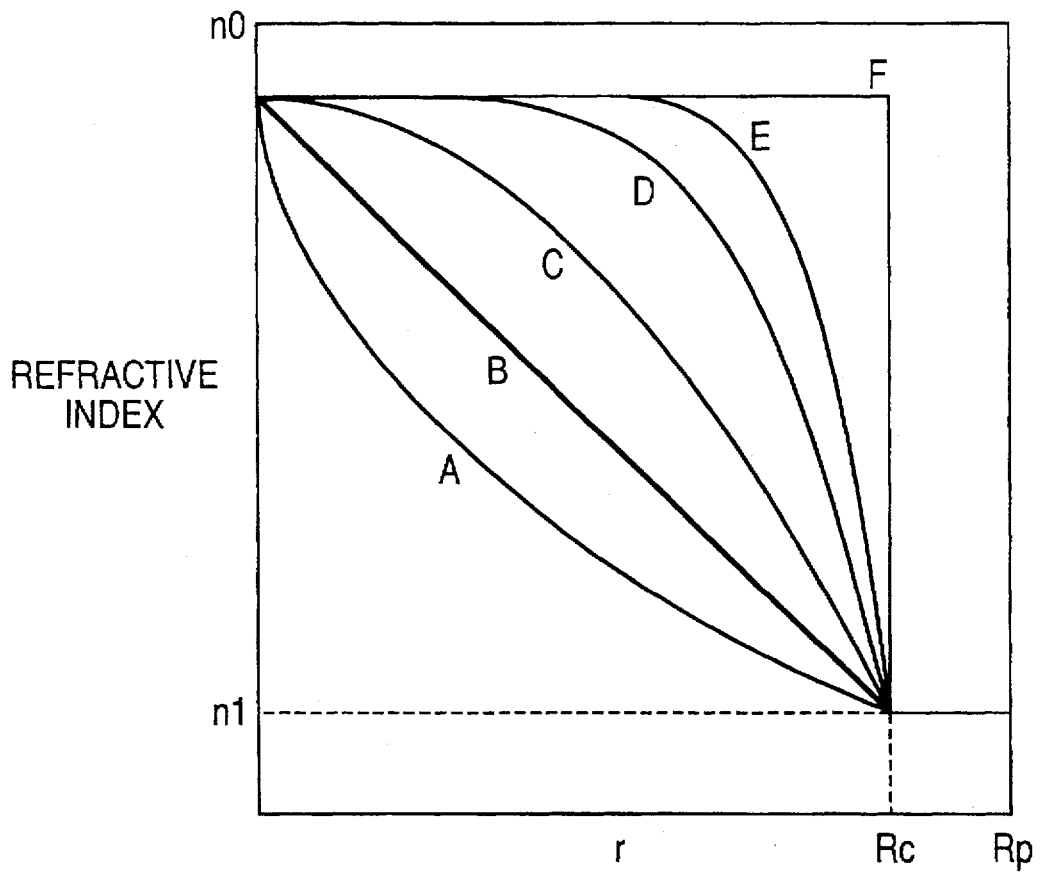
FIG. 1 is a graph showing the dependence of the refractive index distribution on α in a core region.
Figure 2:
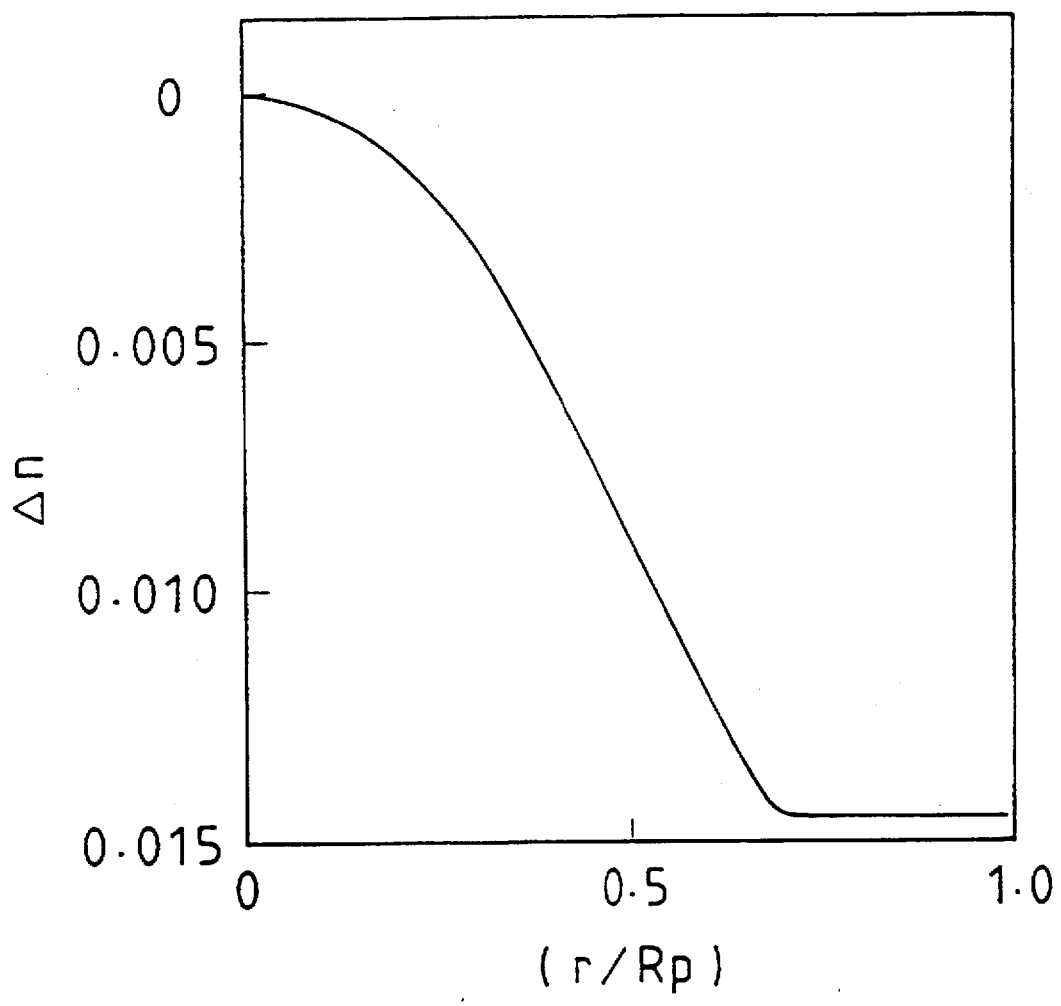
FIG. 2 is a graph showing the refractive index distribution of a GI-type optical fiber produced using MMA and BB.

The synthetic resin rod was subjected to 24-hour vacuum heat treatment at 0.2 mmHg or less and at 105° C. The rod was then slowly inserted into a cylindrical heating furnace from the top thereof while the furnace was maintained at a temperature between 190° C. and 200° C. When the rod was softened sufficiently, spinning at a constant speed was started from the bottom of the rod, thus obtaining an optical fiber of 0.6 mm in diameter and 50 m in length. The distribution of the refractive index of the optical fiber was measured by a horizontal interference method using an interference microscope, and a profile almost identical with the refractive index distribution shown in FIG. 2 was observed over the entire length.

When the distribution of the refractive index was approximated in terms of the aforementioned formula (1), the value of the coefficient α of the refractive index distribution was nearly 1.98.

Figure 3:
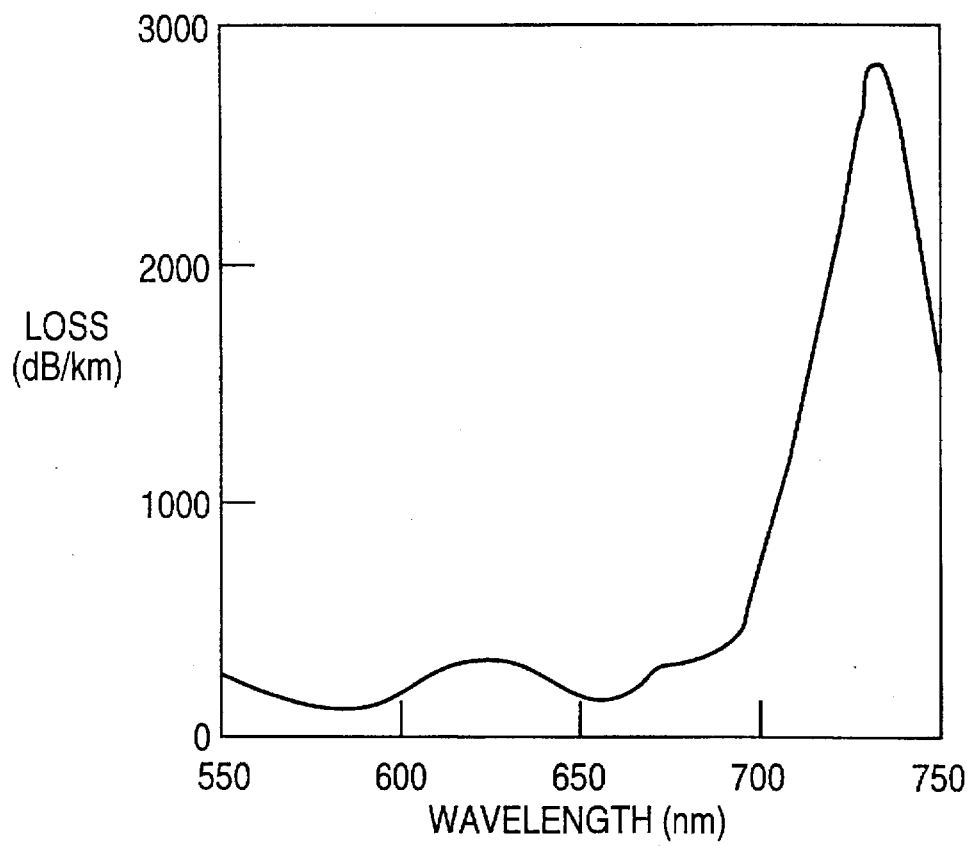
FIG. 3 is a graph showing the relationship between the transmission loss and wavelength of an optical fiber having the refractive index distribution shown in FIG. 2.

Further, when the transmission loss of the same sample was measured using a white light source and a spectrum analyzer, the result shown in FIG. 3 was obtained. The transmission loss value at a wavelength of 580 nm, for example, was 98 dB/km, proving that the optical fiber had a high level of transparency as an optical resin.

Figure 4:
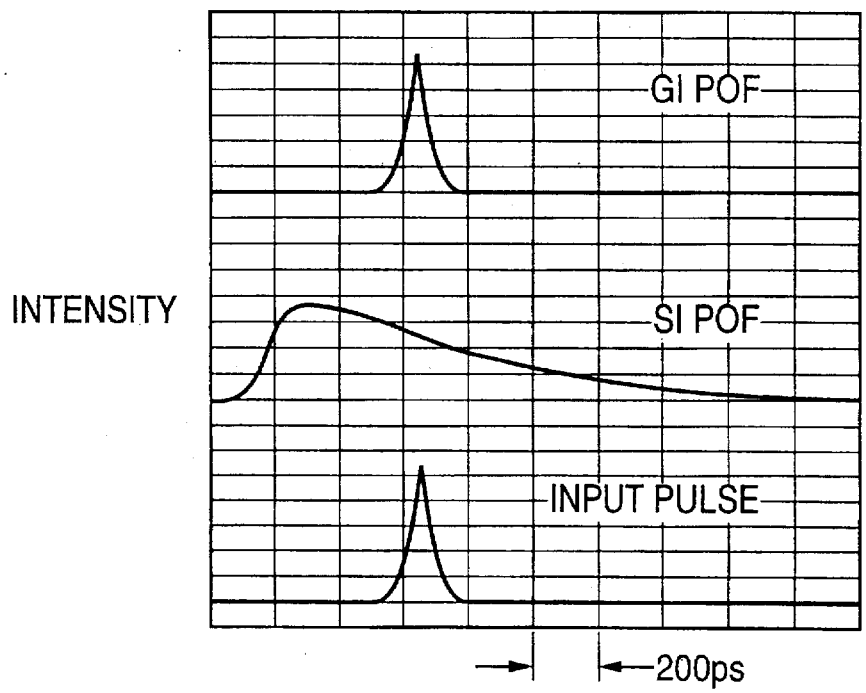
FIG. 4 is a chart showing the output pulse waveforms of an SI type optical fiber and a GI type optical fiber, observed after transmission for 20 meters.

Next, measurement was carried out on the transmission band. An LD (laser diode) having a wavelength of 670 nm was used as the light source and was driven by pulses of 80 ps supplied from a pulse generator. The output pulse light from the LD was converged using an object lens having a numerical aperture of 0.5 to make it enter the sample optical fiber from an end face thereof. The light was guided through the optical fiber for 20 meters, and the output light from the fiber end was received on a photo detector sampling head to detect the waveform of the output light pulse with a sampling oscilloscope. The detected waveform is as shown at GI POF in FIG. 4. SI POF, which is also shown in FIG. 4, indicates the waveform detected when a similar measurement was applied to a commercially available SI type optical fiber. In the same diagram, INPUT PULSE indicates the waveform of the input light pulse.

It can readily be understood from FIG. 4 that, while the input pulse waveform of the SI POF exhibits conspicuous distortion, the GI POF of the optical fiber, which was obtained according to the embodiment, shows almost no distortion in the input waveform.

In addition, Fourier transformation was applied to the output light pulse to measure the frequency characteristics thereof, and a frequency at which 3 dB attenuation occurred was found to be approximately 1 GHz·km. From this, it was found that the optical fiber obtained according to this embodiment had a transmission band approximately 200 times as wide as that of a commercially available SI type optical fiber.

<Embodiment 2>

A glass tube, having a 10 mm inner diameter and held horizontally, was filled with a mixed solution containing methyl methacrylate (MMA) as the polymerizable monomer and o-dichlorobenzene as the substance with different refractive index at a mixing ratio of 4:1 (weight ratio). After adding 0.3 wt % (percent by weight) benzoin methyl ether (BME) as the radical polymerization initiator and 0.15 wt % normal butyl mercaptan (nBM) as the chain transfer agent, both ends of the tube were sealed exercising due care so that there were no bubbles left inside; with the tube being rotated at a speed of 30 rpm, ultraviolet rays were irradiated thereto using a normal UV light source, thereby causing the polymerization to take place. About 8 hours were required to produce a rod-shaped synthetic resin having an outer diameter of 10 mm.

Figure 5:
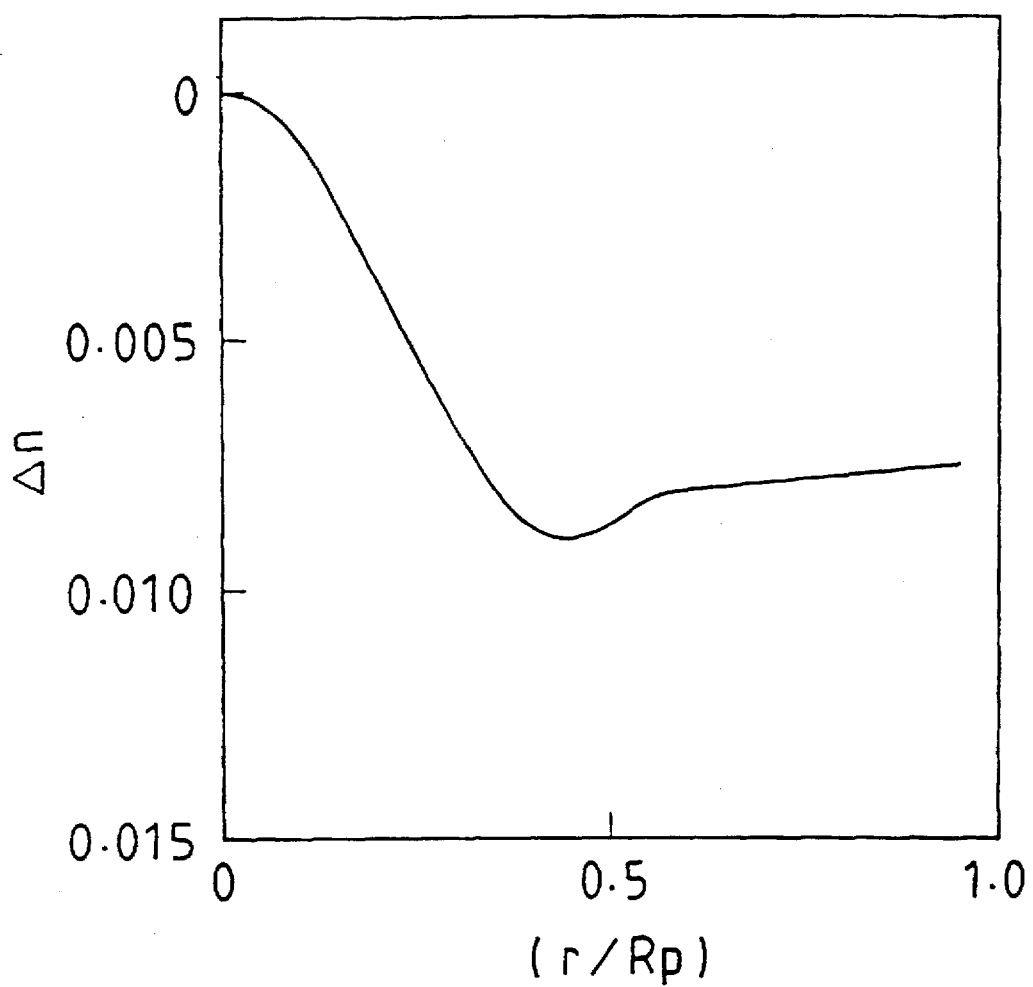
FIG. 5 is a graph showing the refractive index distribution of a GI type optical fiber produced using MMA and o-dichlorobenzene.

The synthetic resin rod was taken out of the polymerization tube (glass tube) and was subjected to 24-hour vacuum heat treatment at 0.2 mmHg or less and 105° C. The rod was then slowly inserted into a cylindrical heating furnace from the top thereof while the furnace was maintained at a temperature between 190° C. and 200° C. When the rod was softened sufficiently, constant-speed spinning was started from the bottom the rod, thus obtaining an optical fiber of 0.6 mm in diameter and 50 m in length. When the distribution of refractive index of thus obtained optical fiber was measured by the horizontal interference method using an interference microscope, a profile almost identical with the refractive index distribution shown in FIG. 5 was observed over the entire length.

When the distribution of the refractive index was approximated in terms of the aforesaid formula (1), the value of the coefficient α of the refractive index distribution was nearly 1.90.

Figure 6:
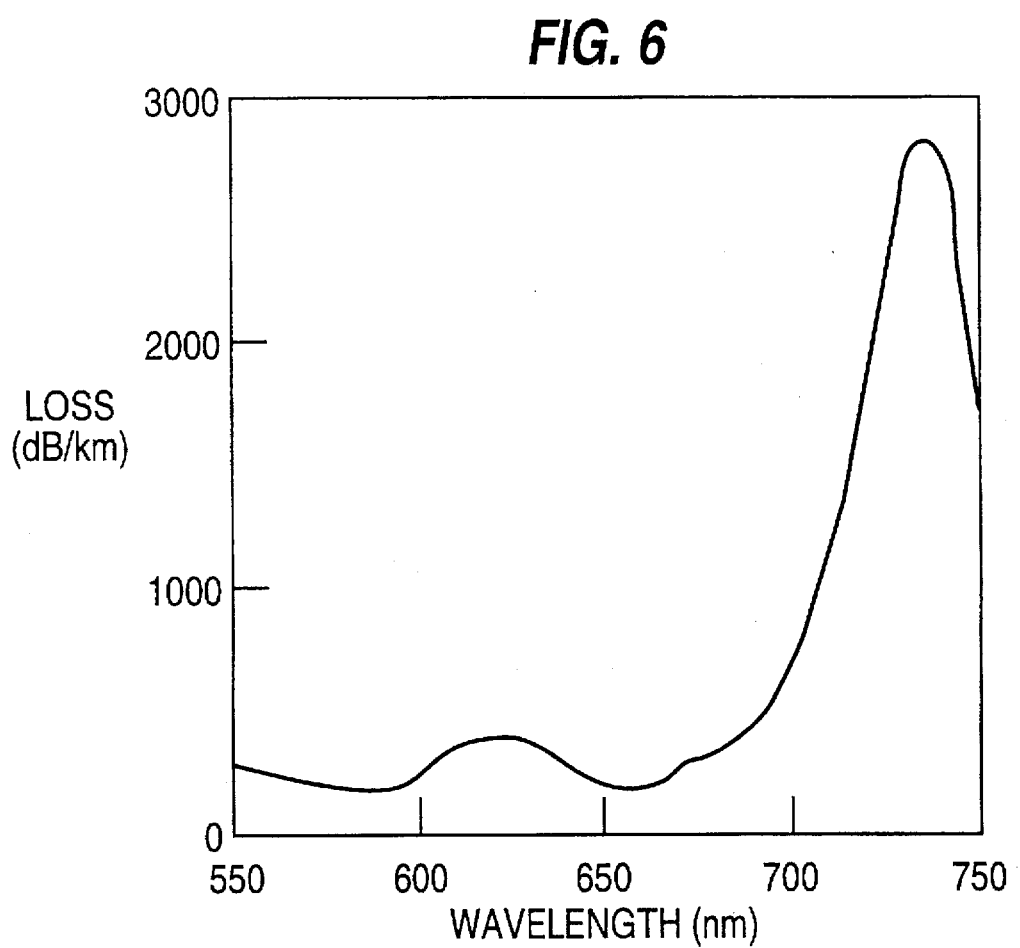
FIG. 6 is a graph showing the relationship between the transmission loss and wavelength of an optical fiber having the refractive index distribution shown in FIG. 5.

Further, when the transmission loss of the same sample was measured using a white light source and a spectrum analyzer, the result shown in FIG. 6 was obtained. The transmission loss value at a wavelength of 580 nm, for example, was 130 dB/km, proving that the optical fiber had an adequate level of transparency as an optical resin.

Next, the transmission band was measured. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the output light from the fiber end was received on a photo detector sampling head to detect the waveform of the output light pulse with a sampling oscilloscope. The detected signal was subjected to Fourier transformation to measure the frequency characteristics thereof and to determine a frequency at which 3 dB attenuation occurs. The result was approximately 500 MHz·km. From this, it was found that the optical fiber obtained according to this embodiment had a transmission band about 100 times as wide as that of a commercially available SI type optical fiber.

<Embodiment 3>

First, MMA was put into a test tube, and 0.5 wt % benzoyl peroxide (BPO) and 0.15 wt % normal butyl mercaptan (nBM) were added, then the mixture was heated at 70° C. for 40 minutes to prepare an MMA sol. Bromobenzene (BB), as the substance with different refractive index, was mixed in the MMA sol so that the mixing ratio was 4:1 (weight ratio); the mixture was thoroughly stirred; and then the mixed solution was filled in a glass tube having a 10 mm inner diameter and held horizontally. Both ends of the tube were sealed exercising due care so that there were no bubbles left inside, and then the tube was heated from outside in accordance with conventional procedure while the tube was rotated at a speed of 30 rpm, thereby allowing heat polymerization to progress for about 20 hours.

Figure 7:
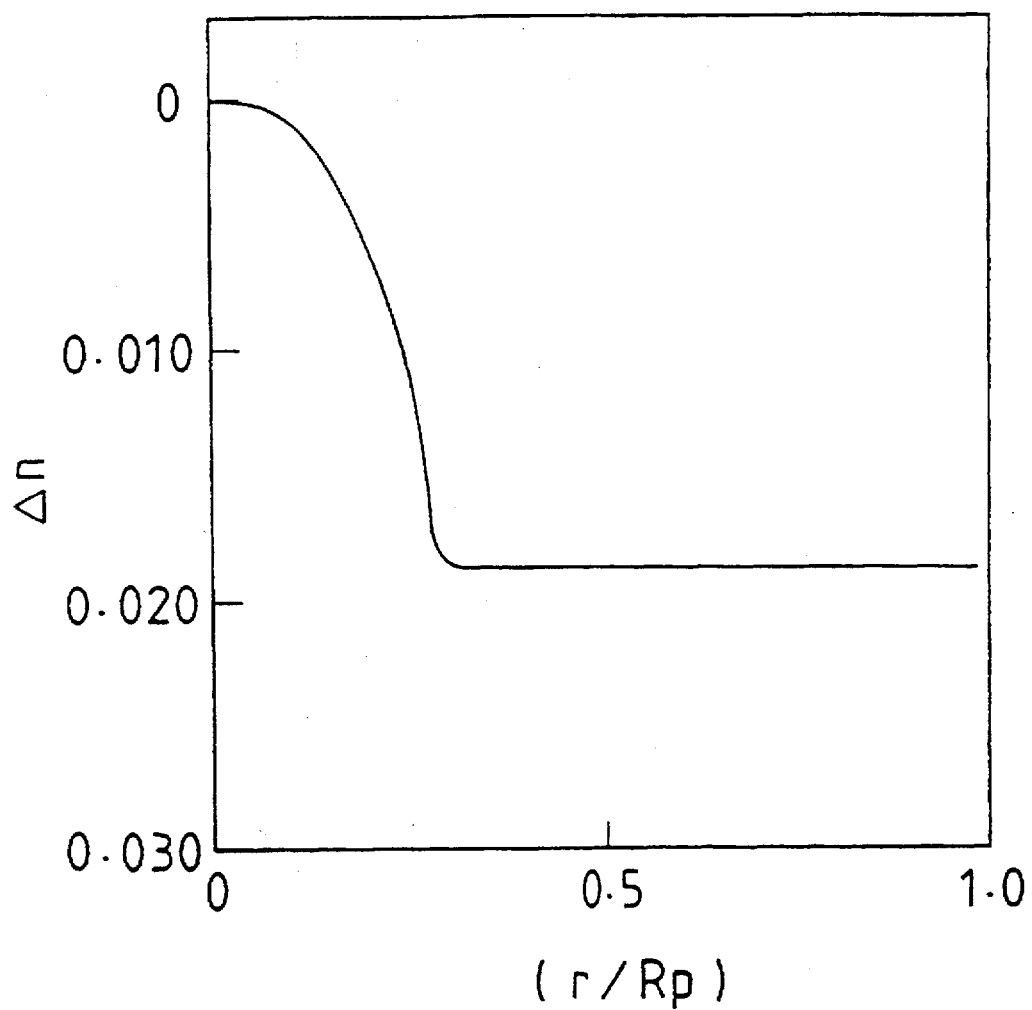
FIG. 7 is a graph showing the refractive index distribution of a GI type optical fiber produced using solated MMA and BB.

The rod-shaped synthetic resin having a 10 mm outer diameter was taken out of the glass tube and was subjected to 24-hour vacuum heat treatment at 0.2 mmHg or less and at 105° C. The resin was then slowly inserted into a cylindrical heating furnace from the top thereof while the furnace was maintained at a temperature between 190° C. and 200° C. When the rod was softened sufficiently, constant-speed spinning was started from the bottom of the rod, thus obtaining an optical fiber of 0.6 mm in diameter and 50 m in length. When the distribution of refractive index of the optical fiber was measured by the horizontal interference method using an interference microscope, a profile almost identical with the refractive index distribution shown in FIG. 7 was observed over the entire length.

When the distribution of the refractive index was approximated in terms of the aforementioned formula (1), the value of the coefficient α of the refractive index distribution was nearly 2.4.

Figure 8:
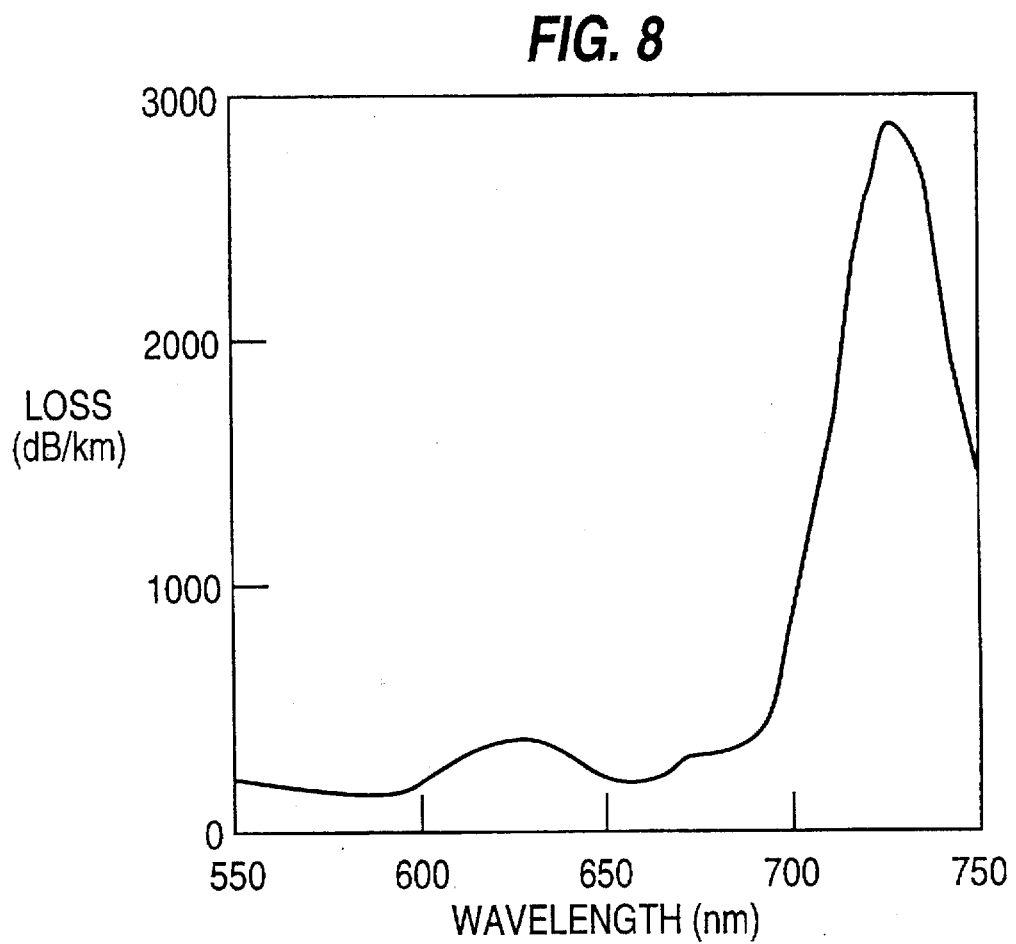
FIG. 8 is a graph showing the relationship between the transmission loss and wavelength of an optical fiber having the refractive index distribution shown in FIG. 7.

Further, when the transmission loss of the same sample was measured using a white light source and a spectrum analyzer, the result shown in FIG. 8 was obtained. The transmission loss value at a wavelength of 580 nm was 110 dB/km, proving that the optical fiber had an adequate level of transparency as an optical resin.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the output light from the fiber end was received on a photo detector sampling head to detect the waveform of the output light pulse with a sampling oscilloscope. The detected signal was subjected to Fourier transformation to measure the frequency characteristics thereof and to determine a frequency at which 3 dB attenuation occurred. The result was approximately 150 MHz·km. From this, it was found that the optical fiber obtained according to this embodiment had a transmission band about 30 times as wide as that of a commercially available SI type optical fiber.

<Embodiment 4>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and the tube was placed in an oven at 80° C. to subject the mixture to heat polymerization while the tube was rotated at 1000 rpm, thereby producing a polymethyl methacrylate tube (PMMA polymerization tube) having a 10 mm outer diameter, a 6 mm inner diameter, and a molecular weight of about 100,000 as a horizontally held polymerization tube.

On the other hand, MMA was put into a test tube, and 0.5 wt % benzoyl peroxide (BPO) and 0.15 wt % normal butyl mercaptan (nBM) were added, then the mixture was heated at 70° C. for 40 minutes to prepare an MMA sol. Bromobenzene (BB) as the substance with different refractive index of mixed in the MMA sol at the mixing ratio of 4:1 (weight ratio), then the mixture was thoroughly stirred, and the mixed solution was filled in the horizontally held PMMA polymerization tube. Both ends of the tube were sealed exercising due care so that there were no bubbles left inside, and then the mixed solution was heated from outside in accordance with conventional procedure while the tube was rotated at a speed of 30 rpm, thereby letting heat polymerization progress for about 20 hours.

The rod-shaped synthetic resin having a 10 mm outer diameter was subjected to 24-hour vacuum heat treatment at 0.2 mmHg or less and 105° C. The resin was then slowly inserted into a cylindrical heating furnace from the top thereof while the furnace was maintained at a temperature between 190° C. and 200° C. When the rod was softened sufficiently, constant-speed spinning was started from the bottom of the rod.

Figure 9:
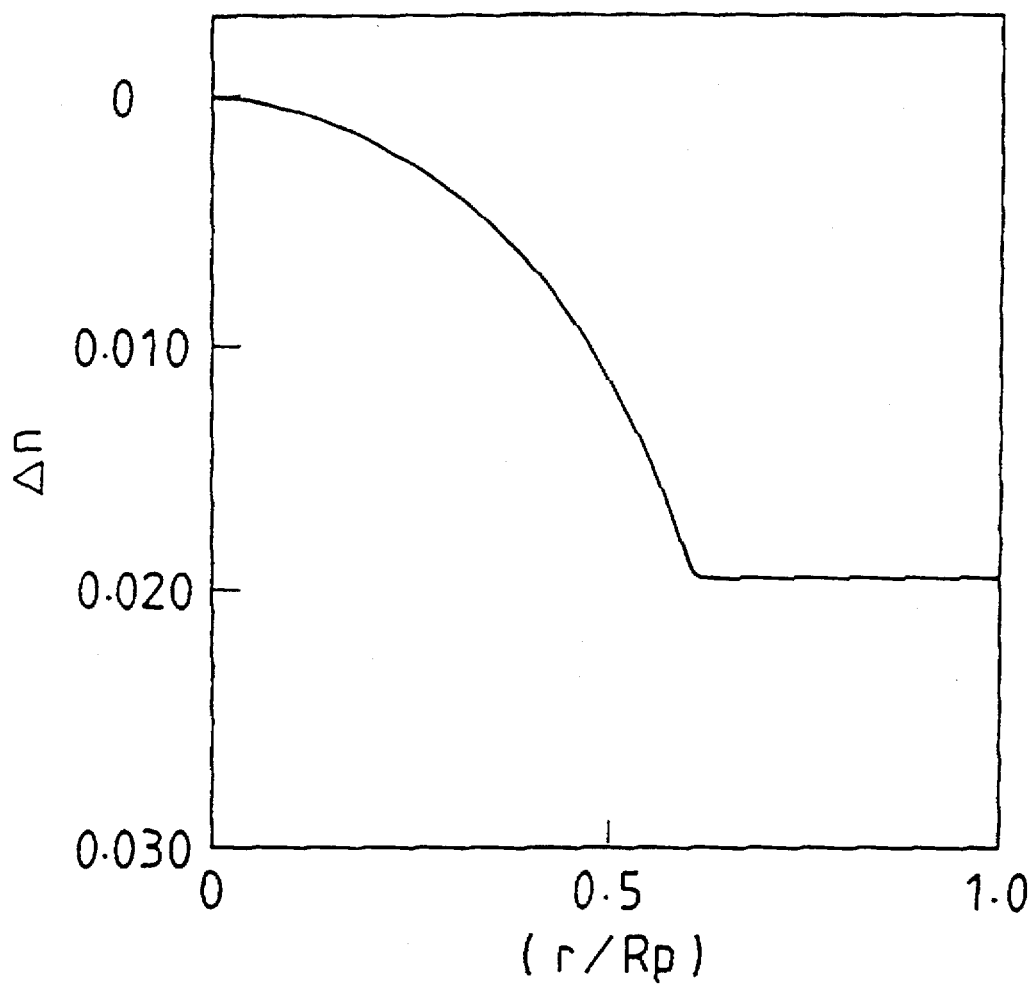
FIG. 9 is a graph showing the refractive index distribution of a GI type optical fiber produced using a PMMA tube, and solated MMA and BB.

When the refractive index distribution of thus produced optical fiber, which had a 0.6 mm diameter and a 50 m length, was measured by the horizontal interference method using an interference microscope, a profile almost identical with the refractive index distribution shown in FIG. 9 was observed over the entire length.

When the distribution of the refractive index was approximated in terms of the aforementioned formula (1), the value of the coefficient α of the refractive index distribution was nearly 1.7.

Figure 10:
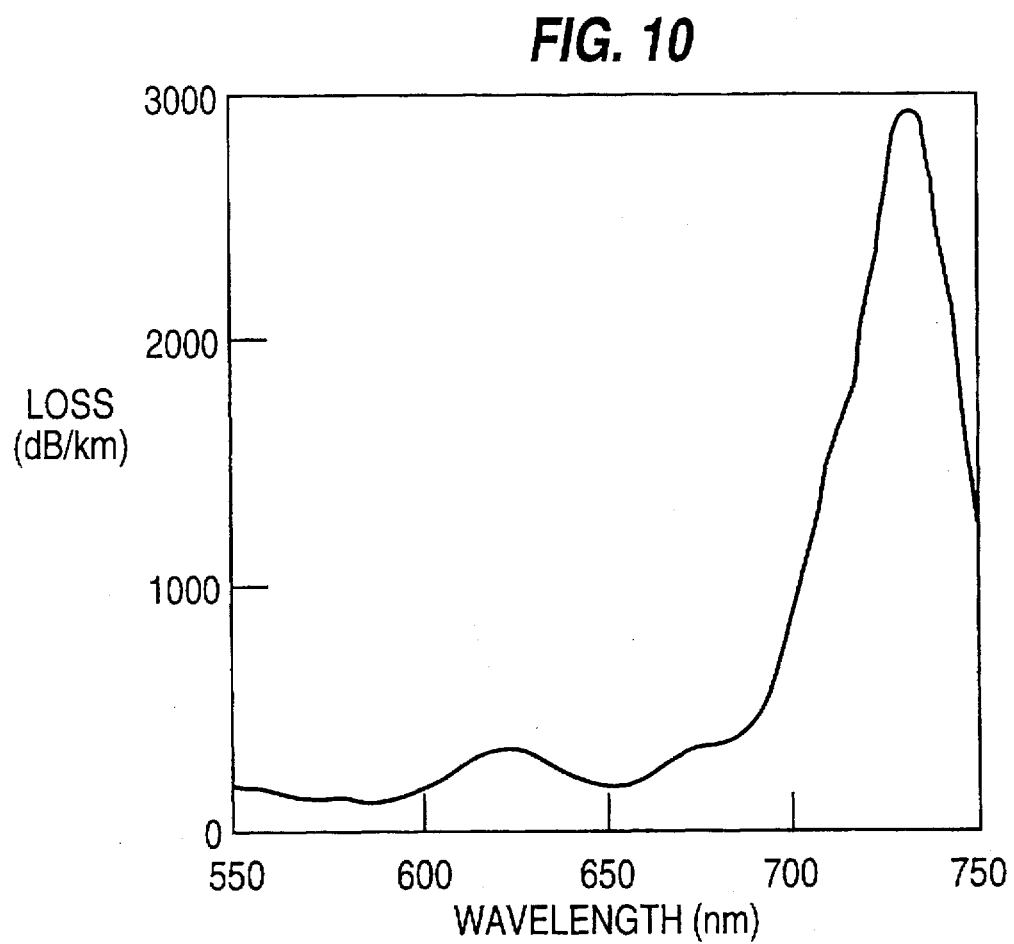
FIG. 10 is a graph showing the relationship between the transmission loss and wavelength of an optical fiber having the refractive index distribution shown in FIG. 9.

Further, when the transmission loss of the same sample was measured using a white light source and a spectrum analyzer, the result shown in FIG. 10 was obtained. The transmission loss value at a wavelength of 580 nm was 110 dB/km, proving that the optical fiber had an adequate level of transparency as an optical resin.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the output light from the fiber end was received on a photo detector sampling head to detect the waveform of the output light pulse with a sampling oscilloscope. The detected signal was subjected to Fourier transformation to measure the frequency characteristics thereof and to determine a frequency at which 3 dB attenuation occurred. The result was approximately 130 MHz·km. From this, it was found that the optical fiber obtained according to this embodiment had a transmission band about 25 times as wide as that of a commercially available SI type optical fiber.

<Embodiment 5>

A glass tube, having an inner diameter of 10 mm and held horizontally, was filled with methyl methacrylate (MMA-d8), which had a molecular structure with all its hydrogen atoms (H atoms) replaced by deuterium, 0.5 wt % benzoyl peroxide (BPO), and 0.15 wt % normal butyl mercaptan (nBM). Both ends of the glass tube were sealed, and then the tube was placed in an oven at 80° C. for heat polymerization while the tube was rotated at 1000 rpm, thus producing a deuterated polymethyl methacrylate tube (PMMA-d8 polymerization tube) having a 10 mm outer diameter, a 6 mm inner diameter, and a molecular weight of about 100,000.

The PMMA-d8 polymerization tube was taken out of the glass tube and held horizontally. Then, the polymerization tube was filled with a mixed solution of a deuterated polymerizable monomer and a deuterated substance with a different refractive index. More specifically, deuterated methyl methacrylate (MMA-d8) having a molecular structure wherein all H atoms were replaced by D atoms, and deuterated bromobenzene (BB-d5) also having a molecular structure wherein all H atoms were replaced by D atoms, were mixed at a mixing ratio of 4:1 (weight ratio). After adding 0.3 wt % benzoin methyl ether (BME) as the radical polymerization initiator and 0.15 wt % normal butyl mercaptan (nBM) as the chain transfer agent to the mixture, both ends of the tube were sealed, exercising due care so that there were no bubbles left inside. With the tube being rotated at a speed of 30 rpm, ultraviolet rays were irradiated using a normal UV light source, thus allowing polymerization to take place. About 8 hours were required to produce a rod-shaped synthetic resin having an outer diameter of 10 mm.

The synthetic resin rod was subjected to 24-hour vacuum heat treatment at 0.2 mmHg or less and at 105° C. The rod was then slowly inserted into a cylindrical heating furnace from the top thereof while the furnace was maintained at a temperature between 190° C. and 200° C. When the rod was softened sufficiently, constant-speed spinning was started from the bottom of the rod.

Figure 11:
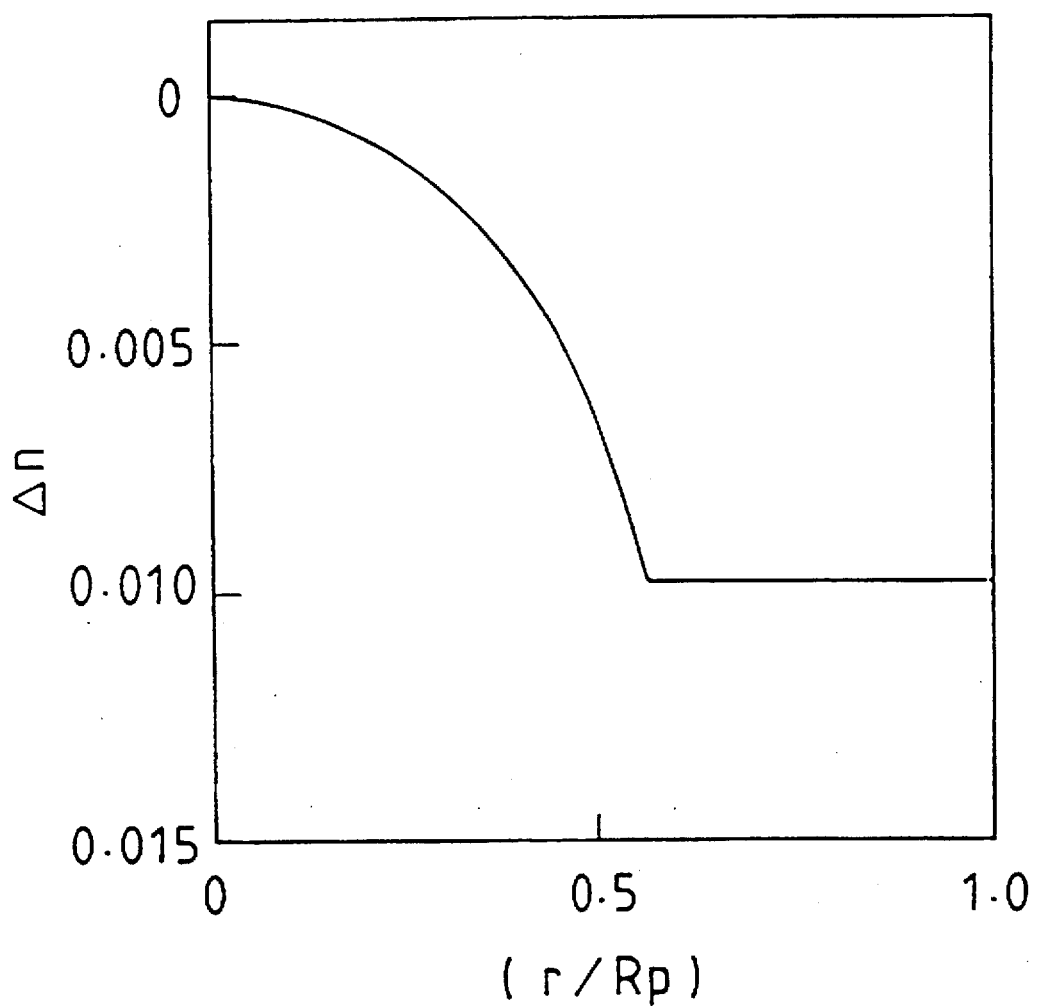
FIG. 11 is a graph showing the refractive index distribution of a GI type optical fiber produced using MMA-d8 and BB-d5.

When the refractive index distribution of the 0.6 mm-diameter, 50 m-long optical fiber thus produced was measured by the horizontal interference method using an interference microscope, a profile almost identical with the refractive index distribution shown in FIG. 11 was observed over the entire length.

When the distribution of the refractive index was approximated in terms of the aforementioned formula (1), the value of the coefficient α of the refractive index distribution was nearly 1.7.

Figure 12:
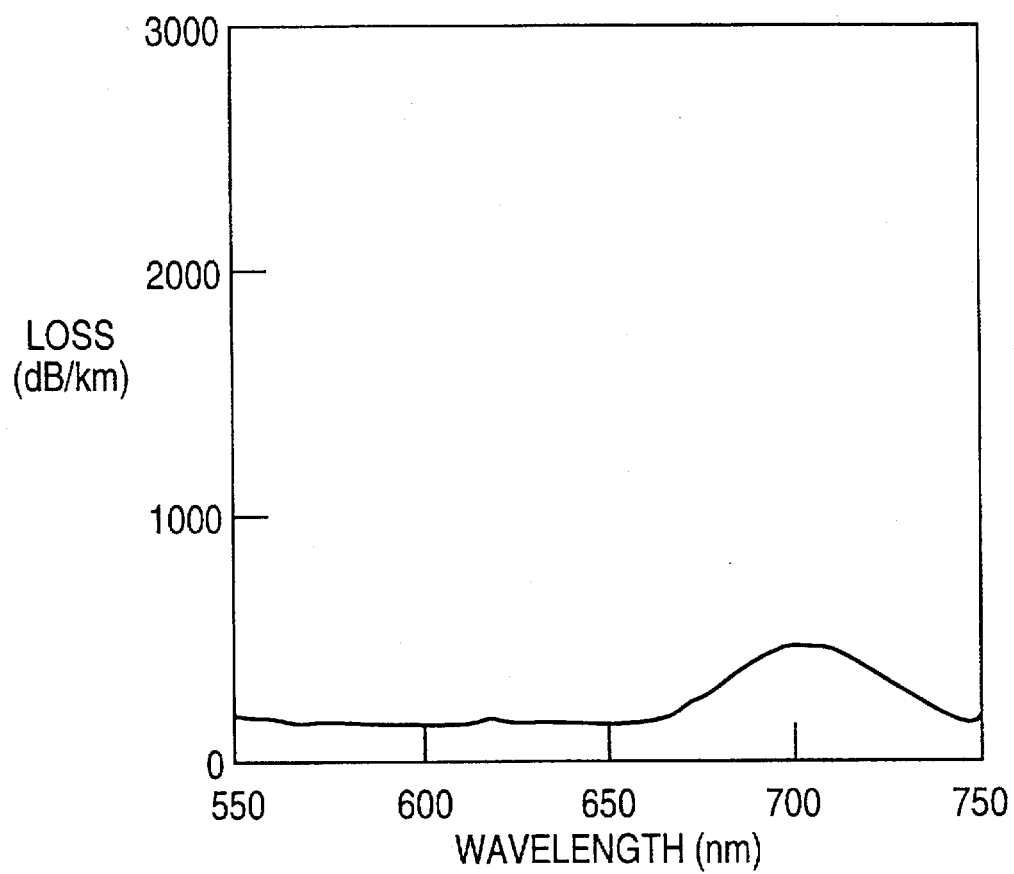
FIG. 12 is a graph showing the relationship between the transmission loss and wavelength of an optical fiber having the refractive index distribution shown in FIG. 11.

Further, when the transmission loss of the same sample was measured using a white light source and a spectrum analyzer, the result shown in FIG. 12 was obtained.

Comparison of FIG. 12 with FIGS. 3, 6, 8 and 10 reveals that an absorption peak observed between 600 nm and 650 nm does not exist in the case shown in the case shown in FIG. 12. This is obviously due to the effect brought about by the deuteration of the hydrogen atoms. The transmission loss value was about 100 dB/km even at a relatively long wavelength (near infrared area) such as 740 nm wavelength. This demonstrates that an optical resin having a constant level of transparency over a wide range of wavelength covering from such a long wavelength to a visible light region could be produced by the process according to this embodiment.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the light emitted from the fiber end was received on a photo detector sampling head to detect the waveform of the output light pulse with a sampling oscilloscope. The detected signal was subjected to Fourier transformation to measure the frequency characteristics thereof, thereby determining that a frequency causing 3 dB attenuation was approximately 150 MHz·km. From this, it was found that the optical fiber obtained according to this embodiment had a transmission band about 30 times as wide as that of a commercially available SI type optical fiber.

<Embodiment 6>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and then the tube was placed in an oven at 70° C. for heat polymerization while the tube was rotated at 1000 rpm. As a result, a polymethyl methacrylate tube (PMMA tube) having a 10 mm outer diameter, a 3 mm inner diameter, and a molecular weight of about 100,000 was produced, and was held horizontally to serve as the polymerization tube.

Benzyl phthalate-n-butyl, as the substance with different refractive index, was mixed in the MMA so that the mixing ratio was 4:1 (weight ratio), and the mixed solution was filled in the horizontally held PMMA polymerization tube. Then, 0.5 wt % BPO, as the radical polymerization initiator, and 0.15 wt % nBM, as the chain transfer agent, were added to the mixed solution. Both ends of the tube were sealed exercising due care so that there were no bubbles left inside, and then the tube was heated from outside in accordance with conventional procedure while the tube was rotated at a speed of 30 rpm, thus allowing heat polymerization to progress for about 20 hours.

The rod-shaped synthetic resin having a 10 mm outer diameter was taken out and was subjected to 24-hour vacuum heat treatment at 0.2 mmHg or less and 180° C. The resin was then slowly inserted into a cylindrical heating furnace from the top thereof while the furnace was maintained at a temperature between 210° C. and 220° C. When the rod was softened sufficiently, constant-speed spinning was started from the bottom of the rod.

Figure 13:
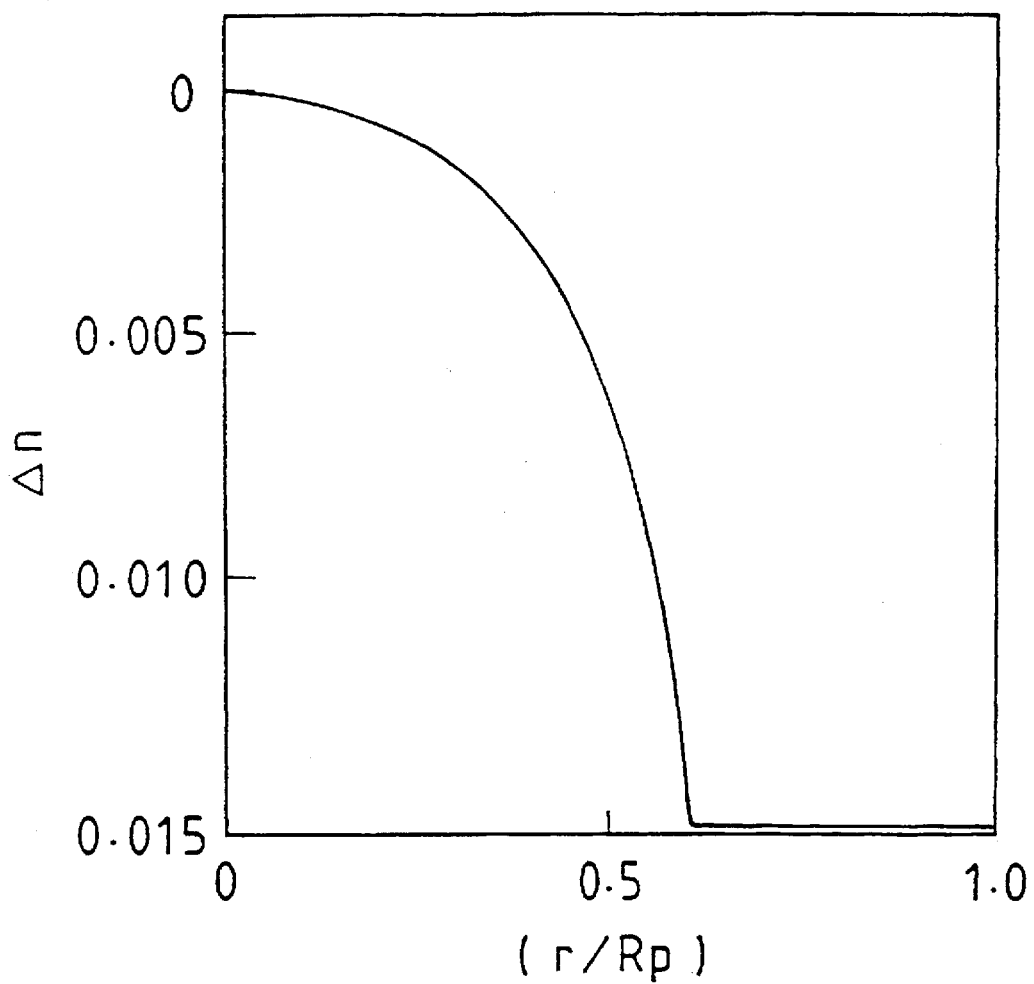
FIG. 13 is a graph showing the refractive index distribution of a GI type optical fiber produced using MMA and benzyl phthalate-n-butyl.
Figure 14:
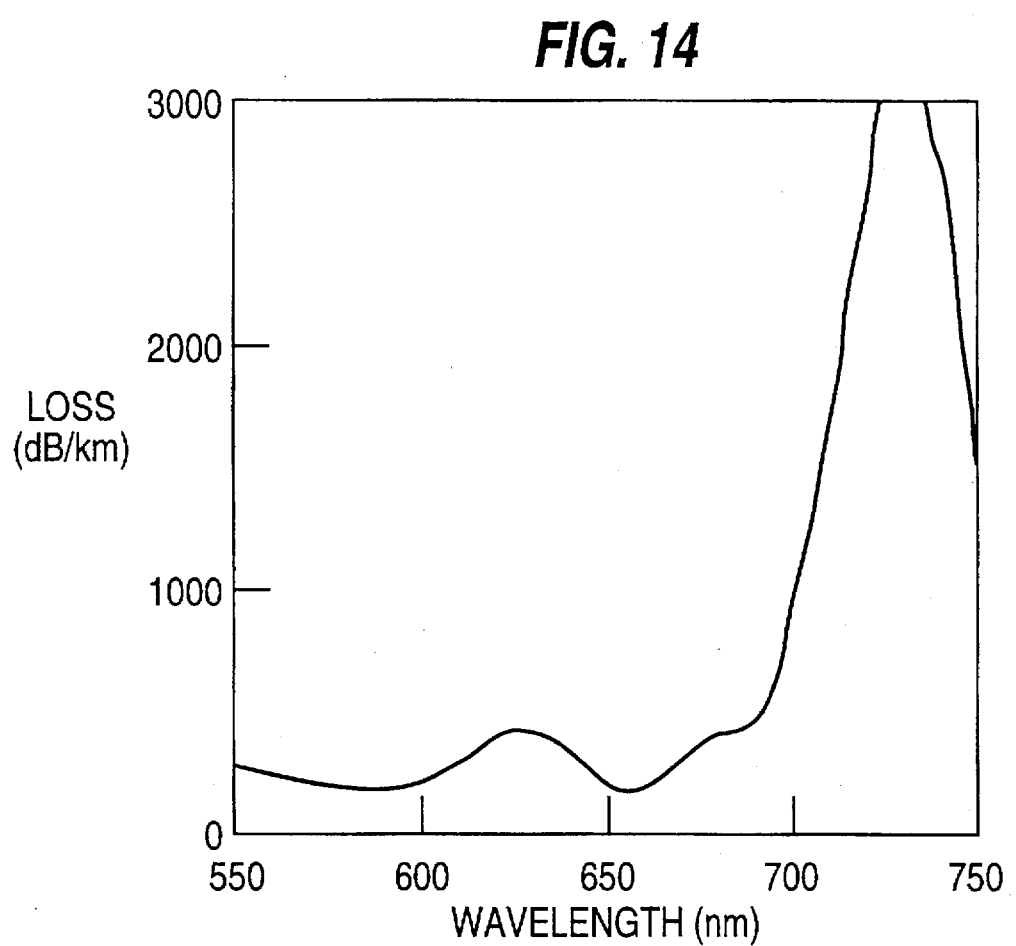
FIG. 14 is a graph showing the relationship between the transmission loss and wavelength of an optical fiber having the refractive index distribution shown in FIG. 13.

When the refractive index distribution of thus obtained optical fiber having a 0.6 mm diameter and a 50 m length was measured by the horizontal interference method using an interference microscope, a profile almost identical with the refractive index distribution shown in FIG. 13 was observed over the entire length.

When the distribution of the refractive index was approximated in terms of the aforementioned formula (1), the value of the coefficient α of the refractive index distribution was nearly 2.6.

Further, when the transmission loss of the same sample was measured using a white light source and a spectrum analyzer, the result shown in FIG. 10 was obtained. The transmission loss value at a wavelength of 650 nm was 150 dB/km, proving that the optical fiber had a considerable level of transparency as an optical resin.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the light output from the fiber end was received on a photo detector sampling head to detect the waveform of the output light pulse with a sampling oscilloscope. The detected signal was subjected to Fourier transformation to measure the frequency characteristics thereof, thereby determining that a frequency causing 3 dB attenuation was approximately 100 MHz·km. From this, it was found that the optical fiber obtained according to this embodiment had a transmission band about 20 times as wide as that of a commercially available SI type optical fiber.

<Embodiment 7>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and then the tube was placed in an oven at 70° C. for heat polymerization while the tube was rotated at 1000 rpm, whereby a polymethyl methacrylate tube (PMMA polymerization tube) having a 10 mm outer diameter, a 3 mm inner diameter, and a molecular weight of about 100,000 was obtained.

The PMMA polymerization tube was held horizontally and was filled with a mixed solution containing a polymerizable monomer and a substance with a different refractive index. The polymerizable monomer used was methyl methacrylate (MMA), the substance with different refractive index used was benzyl benzoate, and the mixing ratio was 4:1 (weight ratio). After adding 0.5 wt % BPO as the radical polymerization initiator and 0.15 wt % normal butyl mercaptan (nBM) as the chain transfer agent to the mixed solution, both ends of the tube were sealed exercising due care so that there were no bubbles left inside. While the tube was rotated at a speed of 30 rpm, the tube was heated from outside in accordance with conventional procedure, thus performing polymerization. About 20 hours were required to produce a rod-shaped synthetic resin having an outer diameter of 10 mm.

The synthetic resin rod was subjected to 24-hour vacuum heat treatment at 0.2 mmHg or less and 120° C. The rod was then slowly inserted into a cylindrical heating furnace from the top thereof while the furnace was maintained at a temperature between 210° C. and 220° C. When the rod was softened sufficiently, spinning at a constant speed was started from the bottom of the rod.

Figure 15:
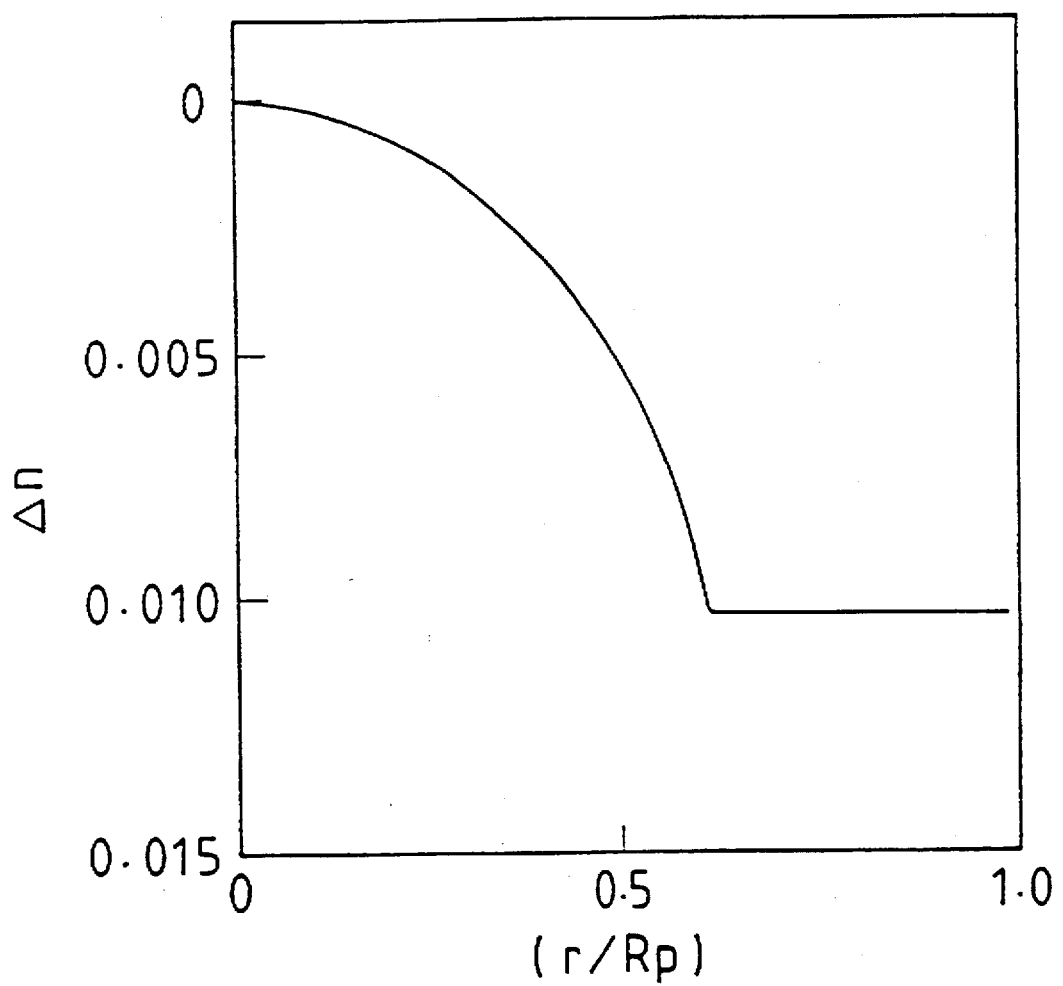
FIG. 15 is a graph showing the refractive index distribution of a GI type optical fiber produced using MMA and benzyl benzoate.

When the refractive index distribution of thus obtained optical fiber of 0.6 mm in diameter and 50 m in length was measured by the horizontal interference method using an interference microscope, a profile almost identical with the refractive index distribution shown in FIG. 15 was observed over the entire length.

When the distribution of the refractive index was approximated in terms of the aforementioned formula (1), the value of the coefficient $\alpha$ of the refractive index distribution was nearly 1.90.

Figure 16:
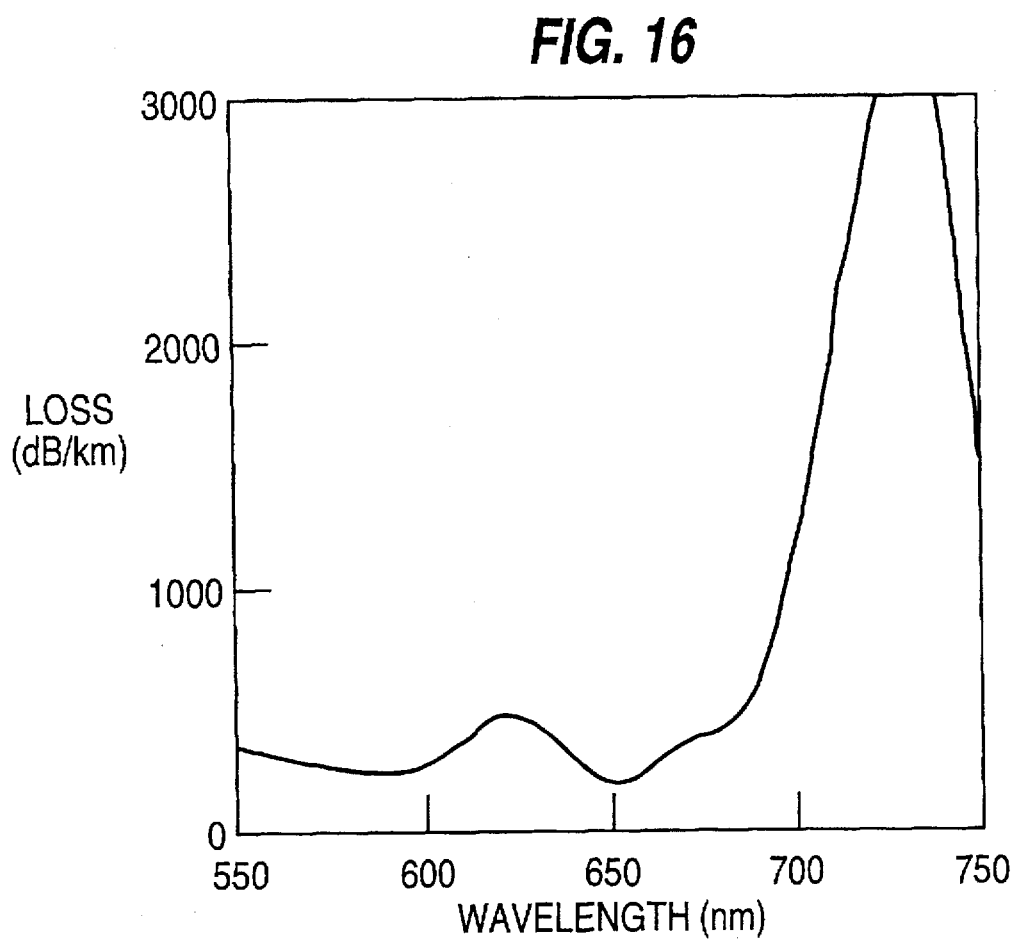
FIG. 16 is a graph showing the relationship between the transmission loss and wavelength of an optical fiber having the refractive index distribution shown in FIG. 15.

Further, when the transmission loss of the same sample was measured using a white light source and a spectrum analyzer, the result shown in FIG. 16 was obtained. The transmission loss value at a wavelength of, e.g., 580 nm, was 150 dB/km, proving that the optical fiber had a considerably high level of transparency as an optical resin.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the light emitted from the fiber end was received on a photo detector sampling head to detect the waveform of the output light pulse with a sampling oscilloscope. The detected signal was subjected to Fourier transformation to measure the frequency characteristics thereof, thereby determining that a frequency causing 3 dB attenuation was approximately 300 MHz·km. From this, it was found that the optical fiber obtained according to this embodiment had a transmission band about 60 times as wide as that of a commercially available SI type optical fiber.

<Embodiment 8>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and then the tube was placed in an oven at 70° C. for heat polymerization while the tube was rotated at 1000 rpm. As a result, a polymethyl methacrylate tube (PMMA polymerization tube) having a 10 mm outer diameter, a 3 mm inner diameter, and a molecular weight of about 100,000 was obtained.

The PMMA polymerization tube was held horizontally and filled with a mixed solution containing methyl methacrylate (MMA) and methacrylic acid at a ratio of 1:1 (weight ratio), and then rhodamine 6G was added as the substance with different refractive index to the mixed solution at a ratio of 6:1 (weight ratio). After adding 0.5 wt % BPO as the radical polymerization initiator and 0.15 wt % normal butyl mercaptan (nBM) as the chain transfer agent to the mixed solution, both ends of the tube were sealed exercising due care so that there were no bubbles left inside. While the tube was rotated at a speed of 30 rpm, the tube was heated from outside in accordance with conventional procedure, thus allowing polymerization to take place. About 20 hours were spent to produce a rod-shaped synthetic resin having an outer diameter of 10 mm.

The synthetic resin rod was subjected to 24-hour vacuum heat treatment at 0.2 mmHg or less and 120° C. The rod was then slowly inserted into a cylindrical heating furnace from the top thereof while the furnace was maintained at a temperature between 210° C. and 220° C. When the rod was softened sufficiently, constant-speed spinning was started from the bottom of the rod.

Figure 17:
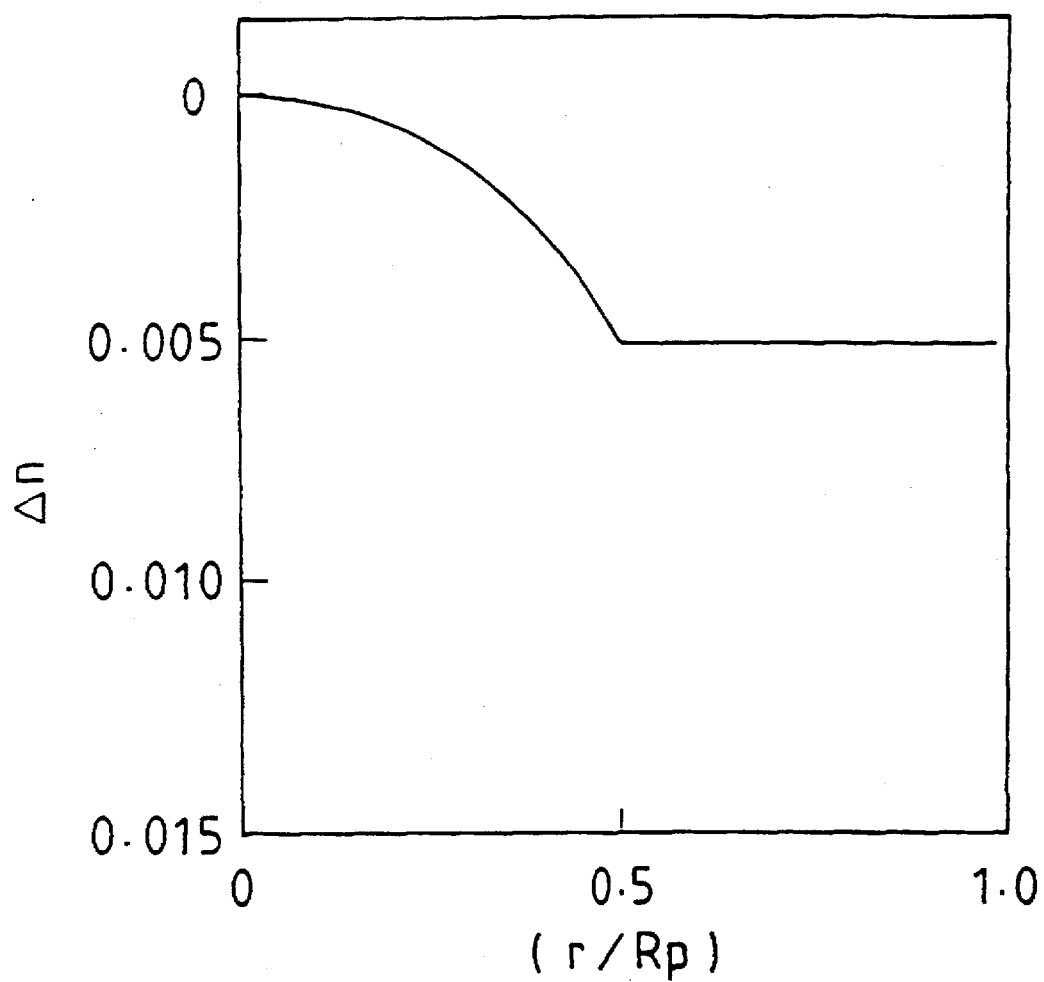
FIG. 17 is a graph showing the refractive index distribution of a GI type optical fiber produced using MMA, methacrylic acid, and rhodamine 6G.
Figure 18:
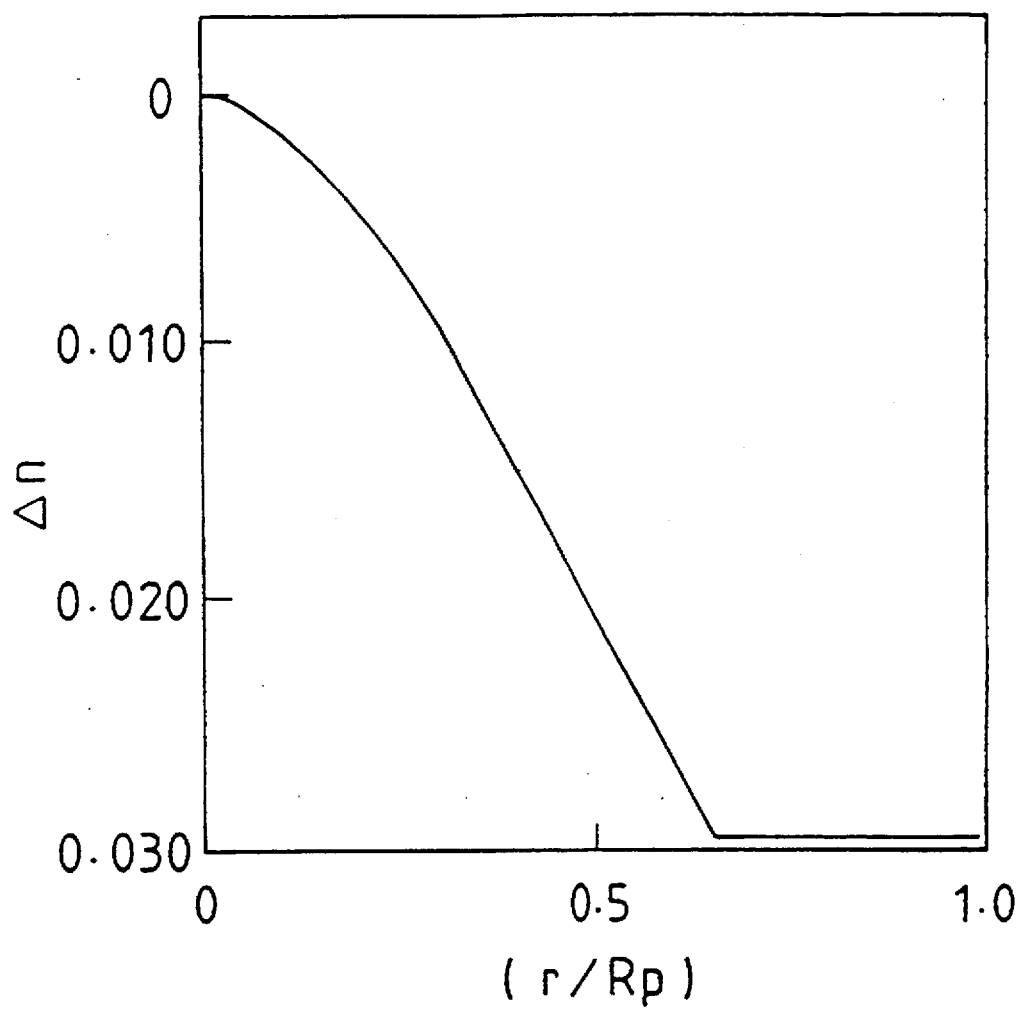
FIG. 18 is a graph showing the refractive index distribution of a GI type optical fiber produced using MMA and DR1.
Figure 19:
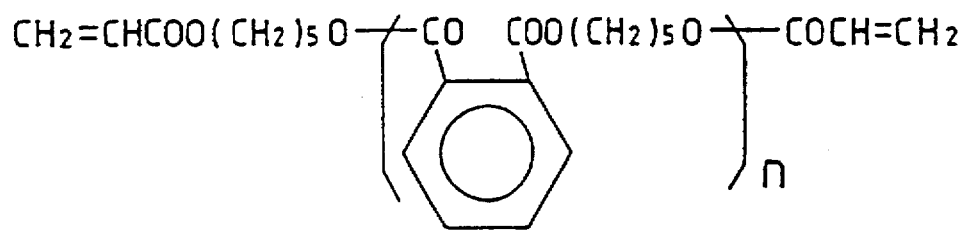
FIG. 19 is a diagram showing the structural formula of a polyester acrylate oligomer used as a substance with a different refractive index.

When the refractive index distribution of thus obtained optical fiber having a 0.6 mm diameter and a 50 m length was measured by the horizontal interference method using an interference microscope, a profile almost identical with the refractive index distribution shown in FIG. 17 was observed over the entire length.

When the distribution of the refractive index was approximated in terms of the aforementioned formula (1), the value of the coefficient $\alpha$ of the refractive index distribution was nearly 1.7.

<Embodiment 9>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and then the tube was placed in an oven at 70° C. for heat polymerization while the tube was rotated at 1000 rpm. As a result, a polymethyl methacrylate tube (PMMA polymerization tube) having a 10 mm outer diameter, a 3 mm inner diameter, and a molecular weight of about 100,000 was obtained.

The PMMA polymerization tube was held horizontally and filled with a mixed solution containing methyl methacrylate (MMA) and disperse red 1 (DR1) as the substance with different refractive index, at a mixing ratio of 4:1 (weight ratio). After adding 0.5 wt % BPO as the radical polymerization initiator and 0.15 wt % normal butyl mercaptan (nBM) as the chain transfer agent, both ends of the tube were sealed exercising due care so that there were no bubbles left inside. While the tube was rotated at a speed of 30 rpm, the tube was heated from outside in accordance with conventional procedure, thereby allowing polymerization to take place. About 20 hours were required to produce a rod-shaped synthetic resin having an outer diameter of 10 mm.

The synthetic resin rod was subjected to 24-hour vacuum heat treatment at 0.2 mmHg or less and 120° C. The rod was then slowly inserted into a cylindrical heating furnace from the top thereof while the furnace was maintained at a deuterated bromobenzene (BB-d5) also having a molecular structure wherein all H atoms were replaced by D atoms, were mixed at a mixing ratio of 4:1 (weight ratio). After adding 0.3 wt % benzoin methyl ether (BME) as the radical polymerization initiator and 0.15 wt % normal butyl mercaptan (nBM) as the chain transfer agent to the mixture, both ends of the tube were sealed, exercising due care so that there were no bubbles left inside. With the tube being rotated at a speed of 30 rpm, ultraviolet rays were irradiated using a normal UV light source, thus allowing polymerization to take place. About 8 hours were required to produce a rod-shaped synthetic resin having an outer diameter of 10 mm.

The synthetic resin rod was subjected to 24-hour vacuum heat treatment at 0.2 mmHg or less and at 105° C. The rod was then slowly inserted into a cylindrical heating furnace from the top thereof while the furnace was maintained at a temperature between 190° C. and 200° C. When the rod was softened sufficiently, constant-speed spinning was started from the bottom of the rod.

When the refractive index distribution of the 0.6 mm-diameter, 50 m-long optical fiber thus produced was measured by the horizontal interference method using an interference microscope, a profile almost identical with the refractive index distribution shown in FIG. 11 was observed over the entire length.

When the distribution of the refractive index was approximated in terms of the aforementioned formula (1), the value of the coefficient α of the refractive index distribution was nearly 1.7.

Further, when the transmission loss of the same sample was measured using a white light source and a spectrum analyzer, the result shown in FIG. 12 was obtained.

Comparison of FIG. 12 with FIGS. 3, 6, 8 and 10 reveals that an absorption peak observed between 600 nm and 650 nm does not exist in the case shown in the case shown in FIG. 12. This is obviously due to the effect brought about by the deuteration of the hydrogen atoms. The transmission loss value was about 100 dB/km even at a relatively long wavelength (near infrared area) such as 740 nm wavelength. This demonstrates that an optical resin having a constant level of transparency over a wide range of wavelength covering from such a long wavelength to a visible light region could be produced by the process according to this embodiment.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the light emitted from the fiber end was received on a photo detector sampling head to detect the waveform of the output light pulse with a sampling oscilloscope. The detected signal was subjected to Fourier transformation to measure the frequency characteristics thereof, thereby determining that a frequency causing 3 dB attenuation was approximately 150 MHz·km. From this, it was found that the optical fiber obtained according to this embodiment had a transmission band about 30 times as wide as that of a commercially available SI type optical fiber.

<Embodiment 6>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and then the tube was placed in an oven at 70° C. for heat polymerization while the tube was rotated at 1000 rpm. As a result, a polymethyl methacrylate tube (PMMA tube) having a 10 mm outer diameter, a 3 mm inner diameter, and a molecular weight of about 100,000 was produced, and was held horizontally to serve as the polymerization tube.

Benzyl phthalate-n-butyl, as the substance with different refractive index, was mixed in the MMA so that the mixing ratio was 4:1 (weight ratio), and the mixed solution was filled in the horizontally held PMMA polymerization tube. Then, 0.5 wt % BPO, as the radical polymerization initiator, and 0.15 wt % nBM, as the chain transfer agent, were added to the mixed solution. Both ends of the tube were sealed exercising due care so that there were no bubbles left inside, and then the tube was heated from outside in accordance with conventional procedure while the tube was rotated at a speed of 30 rpm, thus allowing heat polymerization to progress for about 20 hours.

The rod-shaped synthetic resin having a 10 mm outer diameter was taken out and was subjected to 24-hour vacuum heat treatment at 0.2 mmHg or less and 180° C. The resin was then slowly inserted into a cylindrical heating furnace from the top thereof while the furnace was maintained at a temperature between 210° C. and 220° C. When the rod was softened sufficiently, constant-speed spinning was started from the bottom of the rod.

When the refractive index distribution of thus obtained optical fiber having a 0.6 mm diameter and a 50 m length was measured by the horizontal interference method using an interference microscope, a profile almost identical with the refractive index distribution shown in FIG. 13 was observed over the entire length.

When the distribution of the refractive index was approximated in terms of the aforementioned formula (1), the value of the coefficient α of the refractive index distribution was nearly 2.6.

Further, when the transmission loss of the same sample was measured using a white light source and a spectrum analyzer, the result shown in FIG. 10 was obtained. The transmission loss value at a wavelength of 650 nm was 150 dB/km, proving that the optical fiber had a considerable level of transparency as an optical resin.

Next, measurement was performed on the transmission band. An LD (laser diode) having a wavelength of 670 nm was used as the light source and was driven by pulses of 80 ps supplied from a pulse generator. The output pulse light from the LD was converged using an object lens with a numerical aperture of 0.5 before it was made to enter the sample optical fiber from an end face thereof. The light was guided through the optical fiber for 20 meters, and the light output from the fiber end was received on a photo detector sampling head to detect the waveform of the output light pulse with a sampling oscilloscope. The detected signal was subjected to Fourier transformation to measure the frequency characteristics thereof, thereby determining that a frequency causing 3 dB attenuation was approximately 100 MHz·km. From this, it was found that the optical fiber obtained according to this embodiment had a transmission band about 20 times as wide as that of a commercially available SI type optical fiber.

<Embodiment 7>

A glass tube, having a 10 mm inner diameter and held horizontally, was filled with methyl methacrylate (MMA), 0.5 wt % benzoyl peroxide (BPO), and 0.15 wt % normal butyl mercaptan (nBM). Both ends of the tube were sealed, and then the tube was placed in an oven at 70° C. for heat merization initiators and the like which are selected according to the other factors. Hence, by suitably selecting the combinations, it is possible to meet various requirements for the optical properties (refractive index distribution, transparency, spectral penetrating characteristics, resistance to radiation damage, etc.), mechanical properties (strength, rigidity, etc.), and chemical and thermal properties (resistances to chemicals, humidity and heat, coefficient of thermal expansion, etc.) of optical resins to be produced.

With regard to heat resistance, in particular, an optical conductor with markedly improved characteristics can be obtained by subjecting a product, which has undergone the polymerization reaction for forming a polymeric resin matrix and the necessary hot drawing, etc., to the irradiation of gamma rays or other types of rays as a post-treatment for attaining crosslinking reaction.

Optical conductors using the optical resins of distributed refractive index type produced according to the present invention are applicable to almost all optical elements including optical fibers, various types of lenses, and components for various optical devices (optical waveguides, optical couplers, optical splitters, etc.). Since the resins of the present invention are improved in workability (permitting hot-drawing), economy, lightness of weight, etc., compared with quartz materials which are usually used, there is no doubt that they will prove great usefulness in any fields of optical technology.

I claim:

1. A process for producing an optical resin material having a distributed refractive index in which the refractive index continuously changes in a specific direction, comprising steps of:

filling a polymerization container made of a polymer with a mixed solution containing a first substance including one of a polymerizable monomer and a polymerizable monomer sol, and a second substance, the second substance having a solubility parameter which differs from that of the first substance by 7 $(cal/cm^3)^{1/12}$ or less and having a refractive index which differs from that of the first substance by 0.001 or more;

subjecting the mixed solution to a polymerization reaction to polymerize the first substance, but not the second substance, by applying heat or energy rays to the container from outside the container;

allowing the polymer forming the container to swell and dissolve in the mixed solution from an inner wall of the container so that the polymerization reaction starts and progresses preferentially from a particular region of the mixed solution; and forming a concentration gradient of said second substance through said polymerization reaction.

2. The process according to claim 1, further comprising the step of forming the mixed solution in which a concentration gradient is formed into an optical fiber.

3. The process according to claim 1, further comprising the step of hot-drawing the mixed solution in which a concentration gradient is formed, and obtaining an optical resin material having a distributed refractive index in the form of an optical conductor.

4. The process according to claim 1, further comprising the steps of:

hot-drawing the mixed solution in which a concentration gradient is formed, and obtaining an optical resin material having a distributed refractive index in the form of an optical conductor; and post-treating the optical conductor and effecting crosslinking in the optical resin material.

5. The process according to claim 1, wherein the polymerization container is made of a polymer having the same composition as the first substance.

6. The process according to claim 2, wherein the polymerization container is made of a polymer having the same composition as the first substance.

7. The process according to claim 3, wherein the polymerization container is made of a polymer having the same composition as the first substance.

8. The process according to claim 4, wherein the polymerization container is made of a polymer having the same composition as the first substance.

* * * * *

UNITED STATES PATENT AND TRADEMARK OFFICE
CERTIFICATE OF CORRECTION

PATENT NO.:   5,763,514
DATED     :   June 9, 1998
INVENTOR(S):  Yasuhiro Koike

It is certified that error appears in the above-identified patent and that said Letters Patent is hereby corrected as shown below:

On the title page: Item [54] and Column 1, line 3, change "PRODUCTING" to --PRODUCING--.

Col. 27, line 39, change "1/12" to --1/2--.

Signed and Sealed this

Seventeenth Day of August, 1999

Attest:

Q. TODD DICKINSON

*Attesting Officer*         *Acting Commissioner of Patents and Trademarks*